United States Patent
Katevenis

(10) Patent No.: US 10,158,574 B2
(45) Date of Patent: Dec. 18, 2018

(54) DYNAMIC MAX-MIN FAIR RATE REGULATION APPARATUSES, METHODS, AND SYSTEMS

(71) Applicant: Foundation for Research and Technology—Hellas (FORTH), Heraklion, Crete (GR)

(72) Inventor: Manolis G. H. Katevenis, Crete (GR)

(73) Assignee: FOUNDATION FOR RESEARCH AND TECHNOLOGY—HELLAS (F.O.R.T.H.) INSTITUTE OF COMPUTER SCIENCE (I.C.S.), Heraklion (GR)

( * ) Notice: Subject to any disclaimer, the term of this patent is extended or adjusted under 35 U.S.C. 154(b) by 56 days.

(21) Appl. No.: 14/864,355

(22) Filed: Sep. 24, 2015

(65) Prior Publication Data

US 2016/0087899 A1 Mar. 24, 2016

Related U.S. Application Data

(60) Provisional application No. 62/054,866, filed on Sep. 24, 2014.

(51) Int. Cl.
*H04L 12/815* (2013.01)
*H04L 12/825* (2013.01)

(52) U.S. Cl.
CPC ............ *H04L 47/22* (2013.01); *H04L 47/263* (2013.01)

(58) Field of Classification Search
CPC ....... H04L 47/263; H04L 47/17; H04L 47/18; H04L 47/2441
See application file for complete search history.

(56) References Cited

U.S. PATENT DOCUMENTS 6,633,585 B1 10/2003 Ghanwani et al.
7,925,756 B1 4/2011 Riddle
(Continued)

FOREIGN PATENT DOCUMENTS

EP 1009185 A2 6/2000

OTHER PUBLICATIONS

International Search Report and Written Opinion dated Dec. 23, 2015, of the corresponding International Application PCT/EP2015/072048 filed Sep. 24, 2015, 14 pages.
(Continued)

*Primary Examiner* — Robert M Morlan
(74) *Attorney, Agent, or Firm* — Norton Rose Fulbright US LLP

(57) ABSTRACT

A processor-implemented method for regulating the flow rate of data packets in a network, including defining a global constant representing a regularly repeating time period common among flow sources in the network; transmitting current flow rate information from each of the flow sources, and for each flow, to the links traversed by each flow, exactly once during a current period; categorizing each of the flows passing through the links on the network into a category for the current period for each link by comparing the current flow rate information to a previously determined fair-share flow rate for the link; counting, in each link, the flows per category for the current period; determining a current fair-share flow rate for the current period in each link using the results of the categorizing and counting; and providing control instructions to each of the flow sources to regulate the rate of each flow.

20 Claims, 12 Drawing Sheets

(56) References Cited

U.S. PATENT DOCUMENTS

| | | | |
|---|---|---|---|
| 8,599,684 B1* | 12/2013 | Goertz | H04L 43/026 370/229 |
| 9,553,794 B1* | 1/2017 | Zolla | H04L 47/11 |
| 2006/0120282 A1* | 6/2006 | Carlson | H04L 12/2801 370/229 |
| 2011/0283016 A1* | 11/2011 | Uchida | G06F 9/505 709/235 |
| 2013/0258847 A1 | 10/2013 | Zhang et al. | |
| 2013/0294236 A1* | 11/2013 | Beheshti-Zavareh | H04L 47/22 370/235 |

OTHER PUBLICATIONS

EP Office Action dated Jan. 18, 2018, of the corresponding EP Application No. 15781304.9, 7 pages.

* cited by examiner

DYNAMIC MAX-MIN FAIR RATE REGULATION APPARATUSES, METHODS, AND SYSTEMS

CROSS-REFERENCE TO RELATED APPLICATION

This application claims priority under 35 U.S.C. § 119 to U.S. Provisional Patent Application No. 62/054,866, filed Sep. 24, 2014, the contents of which are incorporated by reference herein in their entirety.

FIELD

The present subject matter is directed generally to apparatuses, methods, and systems to regulate the flow of data through interconnection networks, and more particularly, to DYNAMIC MAX-MIN FAIR RATE REGULATION APPARATUSES, METHODS, AND SYSTEMS (hereinafter MMF Regulator).

BACKGROUND

Interconnection networks connect individual devices into a community of communicating devices, and may be designed for use at different levels across various computer systems depending on the needs of the system. The communicating devices may include anything from a component or set of components within a computer to a single computer to a system of computers. Interconnection networks may include on-chip networks (OCNs) that interconnect microarchitecture within chips; System/storage area networks (SANs) that may be used to connect components within a processor or to connect processors and memory devices, and also for the connection of storage and Input/Output (I/O) components; Local Area Networks (LANs) for interconnecting autonomous computer systems distributed across a defined physical area, such as a machine room or a college campus; and Wide Area Networks (WANs), used to connect computer systems distributed across large distances, the internet being the most well-known WAN connecting many millions of computers over distances of thousands of miles. As interconnection networks become more prevalent, optimizing the performance of these networks becomes more and more critical.

SUMMARY

Interconnection networks carry flows of packetized data from source to destination nodes. A flow is a sequence of packets from a source node to a destination node, where this sequence collectively constitutes one unit of information transferred for one specific purpose of a specific distributed application running on these (and possibly other) nodes. The source node transmits the packets of a flow at a given rate, which may be a fixed or a variable rate. When the aggregate rates of all flows passing through one or more links of the interconnection network exceeds the capacity of the links, rate regulation is needed, which limits the rate of some or all flows so that peak allowed link capacities are observed.

The MMF Regulator may be configured to maximize the rate allocated to the flows that have the minimum rate, up to the point where the rate of such a flow cannot be increased any more due to another bottleneck link that the flow passes through; and then maximize the rates of the remaining minimum flows. Max-Min Fairness (MMF) rates are those rates where (i) the rate of each flow is the minimum among the fair-share rates (FSR) of all the links that the flow traverses, and the links where this minimum occurs are the bottleneck links for this flow. The FSR of each link may be determined as follows: first subtract from the capacity of the link the rates of all the flows that traverse it and that request a rate less than the FSR of the link because the bottleneck of the flows is another link; then, equally divide the remaining link capacity among the rest of the flows that traverse this link, such that this link becomes their bottleneck. The result of this equal division is the FSR of the link.

In one implementation, this MMF Regulator may be configured to provide the following:

(A) Rate Regulation: For every link in the network, the switch (or router) that drives that link maintains and updates, according to (B) below, a number, FSR, that estimates the current fair share rate of that link. The FSR's of the network links are used for the sources of the flows to regulate their rates as follows:

(1) Some packets that a source injects into the network carry a Current Rate (CR) number field in their header, that specifies the rate at which this source is currently injecting packets of this flow into the network.

(2) Some packets that a source injects into the network may—additionally or alternatively—carry a Desired Rate (DR) number field in their header, that specifies a rate, higher than CR, at which this source would like to increase its CR.

(3) Each switch of the network (or just the switches participating in this protocol) can reduce the CR and/or DR field(s) of packets, if they are higher than the FSR of their (outgoing/target) link, so that they can become equal to that FSR value. Optionally, when the CR field is reduced by more than a threshold, feedback may be sent to the source of the flow, containing the new CR (=FSR) value, analogous to the feedback of (4) below, but sent immediately from within the network ("short-circuit feedback") rather than upon network exit.

(4) Upon exit of a packet from the network, where the packet contains a CR and/or a DR field, the exit (destination) node sends a feedback packet to the source of the flow containing a New Rate (NR) field, which is equal to the DR field if that field exists, otherwise it is equal to the CR field, as the field(s) eventually reached the destination.

(5) When a source node receives a feedback packet for a flow containing an NR field, then, if NR is lower that the flow's current CR, the source must decrease its CR to the specified value, otherwise when NR current CR, the source is allowed to increase its CR up to the specified NR value.

(B) FSR Calculation: The FSR value for each link that participates in this protocol can be calculated and updated as follows:

(1) A global time constant is defined for the entire network, called the Rate Reevaluation Period (RRP). Optionally, a global network timer mechanism can be used for identifying the boundaries between successive RRP intervals in a way that is global for the entire network. In another embodiment, two (or more) RRPs may be used, the short RRP being used by the sources of the flows with a CR above a certain threshold, and the long RRP being used for the flows with a low CR.

(2) The source of each flow transmits precisely one Flow and Rate Packet (FRP) in each and every RRP during the duration of the flow. FRPs must identify themselves as such and always contain at least the CR field. If RRP intervals are defined in a global way for the entire network, sources transmit their FRP's at the beginning of each RRP interval.

(3) Flow and Rate counting: For each link (that participates in this protocol), during each RRP, the switch/router that is responsible for it accumulates the following counts across all FRP's that traverse the link during the RRP: (a) for the FRPs whose CR is lower than the current FSR minus a predetermined margin, their CRs are accumulated (added) in one accumulator called bottlenecked-elsewhere aggregate rate (BEAR); (b) for the rest of the FRP's, the number of such FRPs is counted, i.e. the number of such flows, called bottlenecked-here flows count (BHFC). In another embodiment, where two (or more) RRPs are used, a separate set of accumulation counters is provided per RRP, with each pair being reset to zero at the beginning of the corresponding RRP interval.

(4) Next FSR calculation: For each link (that may participate in this protocol), at the end of each RRP, the above accumulated counts (B)(3) are used to calculate the FSR value for the next RRP as follows: (a) subtract the final BEAR value from the usable capacity, Cu, of this link (total capacity minus a safety margin); (b) divide the remaining capacity by the final BHFC count, yielding a new FSR value. The FSR for the next RRP interval is a weighted average of the current FSR and the new FSR that was just calculated. In another embodiment, where two (or more) RRP's are used, the FSR is recalculated during every short RRP as described here, but uses the accumulated counts of the other, longer RRP(s) from their most recently completed RRP interval(s).

(5) Opening and Closing Flows: In an optional optimization case, the first packet of an opening (new) flow and the last packet of a closing flow include a special marking and a CR field, and have, for example, an immediate effect on the FSR: (a) for opening flows with CR<FSR the new CR is subtracted from the link capacity before the division by the number of bottlenecked-here flows that yields the FSR; (b) for opening flows with CR≥FSR, the dividing count of bottlenecked-here flows is increased by one, thus yielding a new FSR; (c) for closing flows with CR<FSR the closing CR is added to the link capacity, analogous to (a) above; and (d) for closing flows with CR≥FSR, the dividing count of flows is decreased by one, analogous to (b) above.

(6) Weighted Fairness: The weighted max-min fair rate allocation can be provided, by including a weight factor $w_f$ in each FRP, and by having all rate calculations done assuming that this flow consists of a number $w_f$ of subflows, where subflows are treated equally among themselves, in just the same way as flows can be treated in the MMF algorithm.

A processor-implemented method for regulating the flow rate of data packets in a network is disclosed. The method may include: defining a global constant representing a regularly repeating time period common among a plurality of flow sources in the network; transmitting current flow rate information from each of the plurality of flow sources, and for each flow, to a plurality of links traversed by each flow, exactly once during a current period; categorizing each of a plurality of flows passing through a plurality of links on the network into a category for the current period for each link by comparing the current flow rate information to a previously determined fair-share flow rate for the link; counting, in each link, the flows per category for the current period; determining a current fair-share flow rate for the current period in each link using the results of the categorizing and counting; and providing control instructions to each of the plurality of flow sources to regulate the rate of each flow based on the current fair-share flow rate calculated for each link.

A system for regulating the flow of data packets in a network is also disclosed. The system may include an interconnection network comprising a plurality of network devices connected by a plurality of links configured to carry data-packet flows; a plurality of nodes in communication with the interconnection network and to act as a source for the data-packet flows; a rate reevaluation period estimator configured to determine a global time constant representing a regularly repeating time period synchronized among the plurality of nodes in the network; a categorization engine configured to receive current flow rate information from each of the plurality of nodes exactly once during a current period and to categorize each of a plurality of data-packet flows passing through the plurality of links on the network into a category for the current period for each link by comparing the current flow rate information to a previously determined fair-share flow rate for the link; a counting engine, configured to count the flows per category for the current period for each link; a fair-share flow regulator configured interface with the counting engine and categorization engine to determine a fair-share flow rate for the current period in each link; and a controller configured to provide control instructions to each of the plurality of flow sources to regulate the rate of each flow based on the current fair-share flow rate calculated for each link.

BRIEF DESCRIPTION OF THE DRAWINGS

The accompanying drawings illustrate various non-limiting, example, inventive aspects of MMF Regulator.

DETAILED DESCRIPTION

The DYNAMIC MAX-MIN FAIR RATE REGULATION APPARATUSES, METHODS, AND SYSTEMS ("MMF Regulator") can provide control instructions from the network to the sources of the flows in order for the sources to regulate the rate of each of the flows to a value not higher than the instructed or predetermined. Such regulation may be desired to achieve substantially complete utilization of the highly-subscribed network links, while avoiding the negative effects of congestion, and without needing the network to maintain per-flow state or queues.

Figure 1:
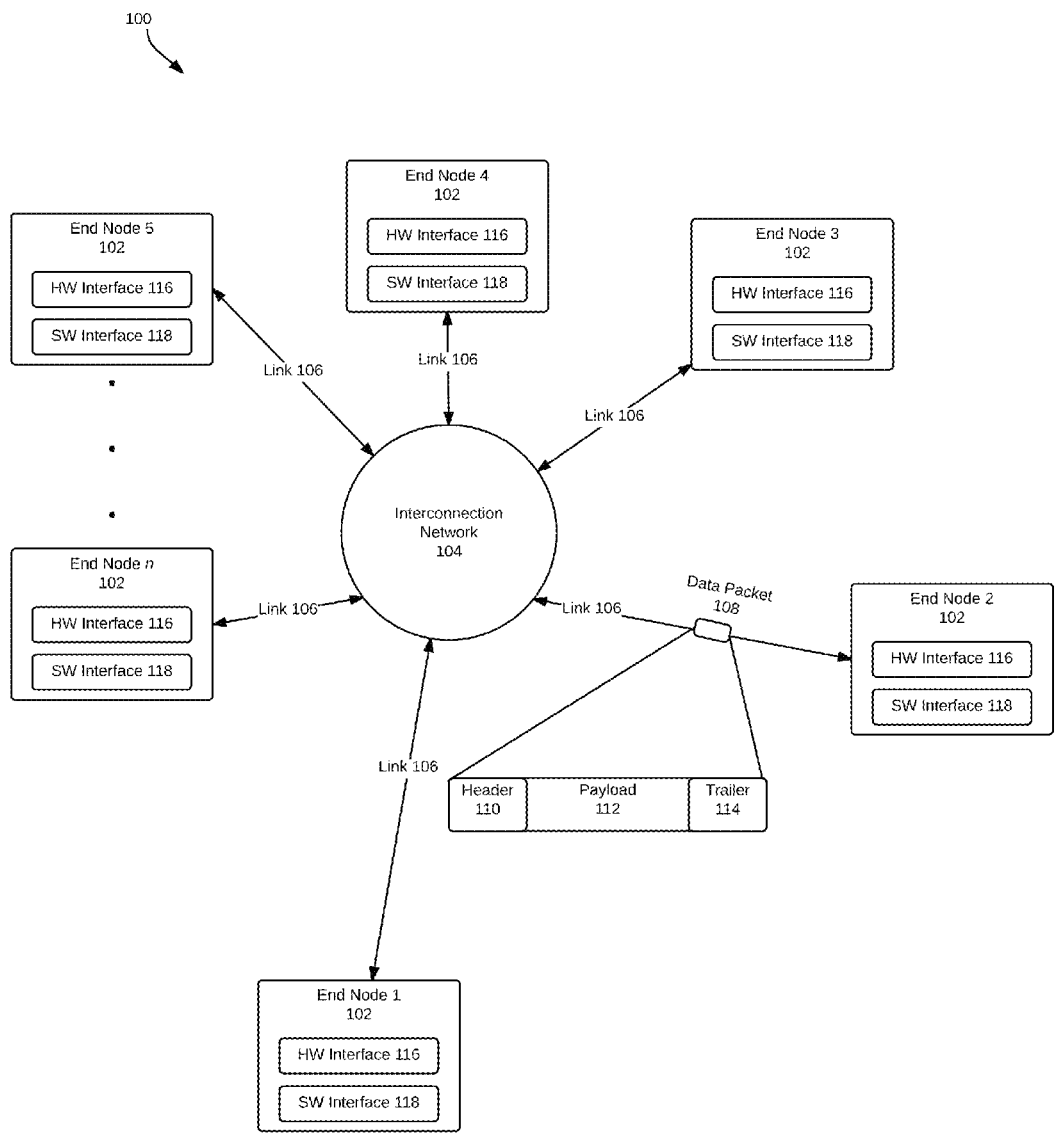
FIG. 1 shows a block diagram illustrating exemplary network architecture that may be used according to an implementation of the MMF Regulator.

FIG. 1 illustrates a network 100 that the MMF Regulator may be configured to operate in. Network 100 includes a plurality of end nodes 102 that are bidirectionally interconnected to an interconnection network 104 through a plurality of links 106. FIG. 1 shows end nodes 1 through n, meaning that network 100 could include any suitable number of nodes. Interconnection network 104 may comprise a plurality of devices, which could range from a component or set of components within a computer, to a single computer, to a system of computers. Interconnection network 104 may be configured to carry flows of packetized data from a source to end nodes 102. Data packet 108, as shown in an expanded view in FIG. 1, is an example of packetized data moving between interconnection network 104 and an end node 102. As shown, data packet 108 may contain a header 110, payload 112, and a trailer 114. Payload 112 is the content of the message being sent between devices, the data that is carried on behalf of an application. In addition to the payload, data packet 108 includes some control bits needed by the network to deliver the massage and process the message. These additional control bits are embedded in header no and/or trailer 114 of data packet 108. To facilitate the transport of data packets over network 100, each end node 102 may have a combination of hardware and software, including a hardware interface 116 and a software interface 118.

Hardware interface 116 and software interface 118 in each end node 102 serve to compose and process incoming messages contained in data packet 108. The interfaces present on certain nodes may vary greatly, depending on the type of device. Devices may include dedicated memory or registers, and may also include software or firmware to perform needed operations. The MMF Regulator may be implemented on the device level, without central control, or on a network level. The MMF Regulator may include various components such as a rate reevaluation period estimator, a categorization engine, a counting engine, a fair-share flow regulator, and a controller.

Figure 2:
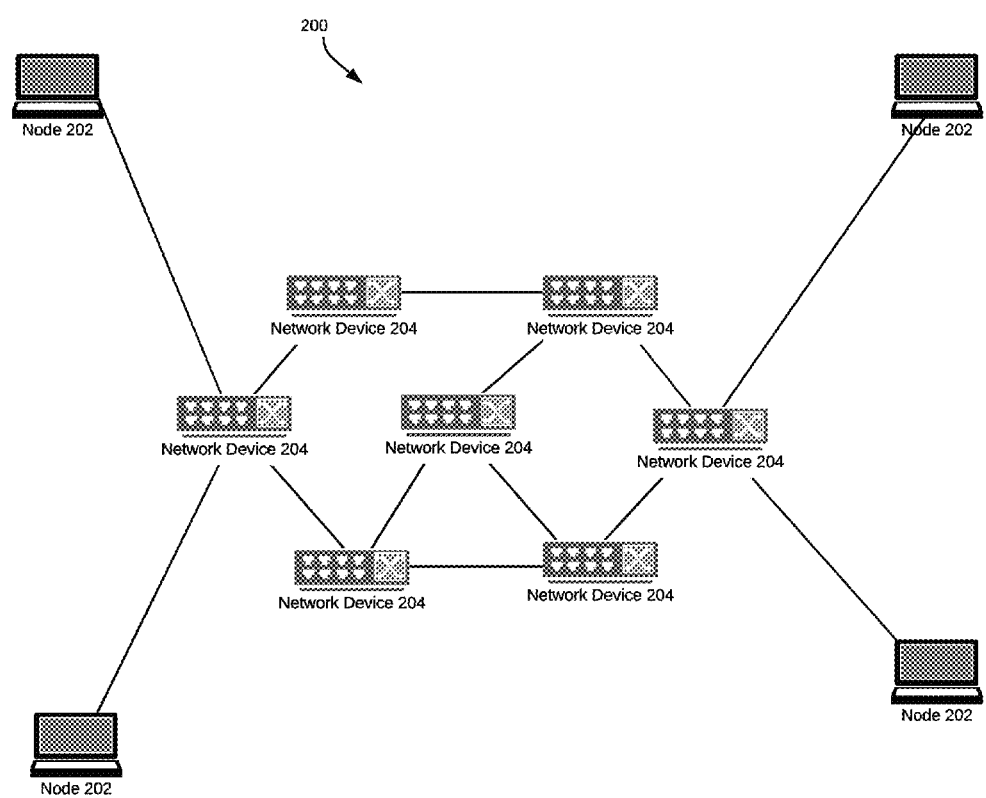
FIG. 2 shows a block diagram illustrating exemplary storage architecture that may be used according to an implementation of the MMF Regulator.

FIG. 2 is an exemplary embodiment of an interconnection network 200 comprising a plurality of computers 202 serving as end nodes and a plurality of interconnected network devices configured to relay data packets between nodes.

Rate Regulation, Max-Min Fairness

Interconnection Networks are generally used for communicating information between end nodes. The MMF Regulator may be used with, but is not limited to, packet-switched interconnection networks, where digitized information is carried within data packets that source nodes transmit (inject into the network) and that at times do not follow a precise, prescribed schedule, in contrast to circuit-switched networks. Interconnection networks consist of communication links that connect switching or routing devices, often called "switches" or "routers." Any reference in this disclosure to switches should be understood to encompass routers and any other suitable device. External nodes, which provide data inputs to and receive data outputs from the network, in the form of packets, may also connect to the network switches through links. Adjacent switches, or switches and external nodes, may be connected by a pair of links, running in opposite directions; for the purposes of this disclosure, each direction may be considered as a separate, unidirectional link. Each switch may have a number of input ports, where the outputs of incoming links are connected, and through which the switch receives incoming packets. Each switch may also have a number of output ports, which feed the inputs of outgoing links with outgoing packets. Each external node may also have at least one output port, which may constitute a source of traffic (packets) for the network, and may also have at least one input port, which may constitute a destination of traffic (packets) for the network. Switches may temporarily buffer packets, but then strive to forward all of these packets, as soon as possible, to the desired outgoing link each, according to the packet's final destination end node.

Rate, Capacity, Contention, Congestion

The performance of data communication, for the purposes of this disclosure, may be measured in terms of Rate of transmission, i.e., how many Bytes of packetized data of a given user of the network can pass through a switch port or link per second. The peak rate of a switch port or of a link, in carrying the aggregate data of a plurality of users, when fully utilized, is called the capacity of that port or link. The rate of transmission for a certain user of the network fluctuates with time—for example, it may be equal to the peak capacity of the link while a packet of that user is being transmitted, and it may be equal to zero at other times. Thus, the average rate of transmission over time windows may be selected, for time windows substantially wider than a single packet transmission time.

Network switches resolve output contention, i.e., two or more data packets that have entered the switch at approximately the same time through different input ports wish, for their further progress through the network, to exit that switch through the same output port. Since each link can carry one packet at a time, output contention may be handled by delaying (temporarily buffering inside the switch) all but one of the contending packets until one of them has been transmitted, and then transmitting the remaining packets. The same problem, when observed over a wider time window, manifests itself as follows: contention appears at an output port of a switch whenever the aggregate rate of arrivals, through all switch input ports, of packets destined to that specific output port, exceeds the capacity of that port (i.e. of its outgoing link). Output contention may appear temporarily, over relatively short time windows, due to the random nature of arrival times of packets destined to a same output port at the various input ports of switches, or it may appear over longer-term time windows, due to the sources of the network pumping data into the network at aggregate rates that exceed the capacity of certain links along the paths of these data or the capacity of network-output destination nodes. Generally, temporary output contention is handled by making use of buffer memories inside the switches, but, no matter how big these memories are made, if contention persists over long enough time periods, any buffer memory can eventually fill up and not be able to handle such longer-term contention.

Congestion is the phenomenon of output contention persisting over a time period comparable to or longer than the time it takes to fill up the buffer memories that are provided at that place for handling such contention. Congestion may appear at internal network links, or at the network outputs, i.e. at destination nodes. For a network with buffer memory sizes that are properly designed for handling the randomness of packet arrival times at switch inputs, congestion is the result of a longer-term phenomenon: source nodes inject data into the network at rates that each of them decides, being unaware of the similar decisions being made at the same time at other source nodes, whose data wish to use the same internal network links or are destined to the same output nodes.

When buffer memories in the network fill up, one strategy is to drop some packets, and another strategy, called backpressure, is to notify upstream switches (and eventually network sources) to delay further packet transmissions. Both strategies have disadvantages when improperly designed or used. Dropped packets can often actually be needed by the application using the network, so they may have to be retransmitted, at a considerable protocol complexity and time delay cost. And delaying further packet transmissions can often negatively affect many more packets than those originally responsible for the congestion, and potentially cause an avalanche effect that can grossly reduce the capacity and utilization of whole regions or even the entire network.

To properly handle congestion, in one implementation, the network informs those sources that are responsible for exceeding the capacity of internal or output congested links so that they can appropriately reduce their rates of injecting traffic into the network, while still letting other sources, that are not responsible for such excess traffic, to keep injecting traffic at their desired rates.

Generally, the Transmission Control Protocol/Internet Protocol (TCP/IP) uses dropped packets as hints of congestion that cause sources to reduce their transmission rate; the problem is that packet dropping is costly. When congestion has progressed as far as causing packets to be dropped, it is already too late to act upon it. When backpressure is used, if used in an indiscriminate way, it causes congestion to spread, affecting much more traffic than those packets that are responsible for congestion: Indiscriminate backpressure delays or stops all traffic going to the congested area; this causes more buffers to fill up, upstream from the congested area. The upstream buffers that fill-up contain packets that are destined not only to the congested area, but also to other, unrelated directions, which are thus delayed although they are not responsible for the initial congestion. The more buffers that fill-up, the more congestion spreads out upstream, due to backpressure delaying more of the upstream traffic. One solution that may be used is per-flow backpressure, which is further discussed below.

Flows, Rate Flow Control (Source Regulation), Fairness

One kind of traffic, consists of a small number of relatively short messages sent by each of many sources to various (semi-random) destination nodes each, followed by those sources waiting for corresponding relatively short responses from those destinations. Examples of such traffic include, but are not limited to, (i) the traffic among cache memories, directories, and main memories under shared-memory cache-coherence protocols, and (ii) control and synchronization messages exchanged between processors or processing cores that are running distributed applications. In such traffic, the size of each message is so small that its transmission time is similar to or smaller than the end-to-end latency of traveling through the network. The number of outstanding messages that each source transmits before it receives a reply to any one of them is limited e.g., by the number of miss-status-holding registers per cache controller in the cache-coherence traffic in case (i) above, or by the usual nature of distributed computations in case (ii) above.

In networks where the prevalent traffic consists of such short messages, congestion is avoided by the self-regulatory nature of this traffic: the total amount of data that each source injects into the network is limited, because, after injecting a relatively small number of relatively small request messages, each source refrains from further injections, waiting for replies to at least some of its pending requests. The MMF Regulator may not be useful for such short-message network traffic, neither for networks where congestion is avoided because such self-regulatory traffic may constitute the prevailing load of the network.

The MMF Regulator is configured to be used with flow-oriented network traffic, which is the other case of traffic in interconnection networks. In particular, this disclosure relates to networks where the majority of the traffic consists of flows. A flow is a sequence of packets sent from a single source node to a single destination node through the network, and where all of those packets concern the same distributed application that runs on those source and destination nodes (as well as, potentially, on other nodes); the total time to transmit all the packets of a flow through the network has to be substantially longer than the end-to-end latency for a single packet to reach from source to destination through the network under light-load conditions. Typical examples of short- or medium-lived flows are, e.g., (i) the transmission of intermediate computation results (e.g., array sub-blocks) among the nodes of a supercomputer that runs a high-performance computation (HPC) application; or (ii) the transmission of significant data records among the nodes running a (parallel or distributed) database application; or (iii) the transmission of data files or significant portions thereof between storage and computation devices; or (iv) the transmission of memory pages among main memories and/or storage devices in a parallel or distributed computation environment; or (v) the transmission of one or more web pages in web-oriented applications; or other similar cases of transmitting batches of data of any size from about a Kilo-Byte to many Mega- or Giga-Bytes. In other cases, streaming applications (e.g., video, audio, or other continuous-medium applications) typically contain one or more long-lived flows that carry such streams of data for time scales lasting anywhere from a millisecond up to a hours or days.

Flow traffic can easily create congestion in a network, if the sources of flows ignore each other and keep pumping data into the network, each at its own desired rate, regardless of whether or not their aggregate rate may exceed the capacity of internal network links or final flow destination nodes. The MMF Regulator may be configured to completely utilize the capacity of the network (its links and its switches), while at the same time avoiding any negative effects of congestion as described above. Note that congestion is not an undesirable situation if defined as full utilization of network links or switch ports—a prerequisite for which is normally that those network resources be oversubscribed, hence the nearly continuous presence of switch-output contention. On the other hand, if congestion is defined as filled-up buffer memories that cause packet drops or indiscriminate slowdown of all upstream traffic due to backpressure, then such congestion is undesirable.

As discussed above, upon congestion, when buffers fill up, some network protocols drop packets, while others use backpressure to stop upstream arrivals that may cause buffer overflow. Both packet dropping and indiscriminate backpressure are highly undesirable in many networks because they result in poor network performance. For example, per-flow queueing and per-flow backpressure may be implemented, which include: providing, in each switch, a separate queue for every flow (or properly selected groups of flows), and providing separate backpressure information for each flow (or groups of flows) based on the traffic circumstances in the different downstream areas of the network through which each of those flows subsequently passes. This strategy allows backpressure to selectively stop or slow down only those flows which, in their downstream path, pass through congested areas of the network, as opposed to all flows under indiscriminate backpressure; in this way, flows destined to non-congested areas of the network do not suffer from the presence of congestion in other areas—for which they are not responsible, and which they are also unable to help avoid. Per-flow queueing and backpressure is effective in mitigating the negative results of congestion, but may be expensive, because of increased buffer space and increased queue management overheads (pointers, control logic, scheduling logic). To this end, the MMF Regulator may be configured to provide an effective alternative to per-flow queueing and backpressure that substantially eliminates congestion while also being significantly less expensive to implement.

The MMF Regulator may be configured to manage congested flows by providing proper feedback information to the sources of the flows that allows them to regulate their rate of transmission of each flow, so that both (a) link (and switch port) capacities are not exceeded, so that buffer memories do not completely fill-up; and at the same time (b) links (and switch ports) are fully utilized, so that flows transmit at the highest possible rate and complete their data transfer, each in the minimum possible time. Backpressure indirectly achieves such source rate regulation by propagating backpressure information upstream, hop-by-hop, until that eventually reaches the sources of the flows.

Another method to achieve source rate regulation is by directly sending rate control messages to the sources of the flows, either from intermediate points (of congestion) inside the network, or from the corresponding destination endpoint of each flow.

Embodiments of the MMF Regulator may belong to the class of rate-based flow control, but compute the rate feedback control information in novel ways. Furthermore, the embodiments described herein are appropriate for hardware implementation, for example, to achieve very fast response time and to implement effective and inexpensive congestion management in high-throughput and low-latency interconnection networks for multiprocessors, cluster computing, data centers, high-performance computation, etc.

When network resources (link and switch output capacity) are not oversubscribed (a condition that is known as feasible network traffic load), then no decision may need to be made by the network as to how much rate each source is allowed to transmit at: each source instead gets everything that it asks for, since total network capacity is not exceeded. The situation is quite different, though, when network resources are oversubscribed, e.g., in case of congestion; then, some of the sources need to reduce their rate of transmission. The embodiments described herein consider the following: according to what criterion can it be decided which of the sources are to reduce their rates, and by how much should their rates be reduced.

In one implementation of the MMF Regulator, various criteria can be used for deciding how to split scarce resources among those contending for these resources. For example, one criterion is to maximize the total throughput of the traffic passing through the network. In some cases, this may be unfair for some of the flows. For example, consider three flows in a network: (i) from S1 to D1; (ii) from S1 to D2; and (iii) from S2 to D2. Also consider that all network links have a capacity of 100 units each, including each of the links from source S1 to the network, from source S2 to the network, from the network to destination D1, and from the network to destination D2. Then, the maximum possible aggregate throughput through this network, with only these three existing flows, is 200 units, since S1 and S2 cannot pump more traffic than that into the network, and destinations D1 and D2 cannot sink more traffic than that from the network. This maximum total throughput of 200 units is achieved when: (i) flow S1 to D1 is allowed to have a rate of 100; (ii) flow S1 to D2 is only allowed a rate of zero (0); and (iii) flow S2 to D2 is allowed a rate of 100. This is clearly unfair to flow S1 to D2, which, under such a policy, cannot operate. A possible "fair" rate allocation can be: (i) flow S1 to D1 to transmit at a rate of 50; (ii) flow S1 to D2 to transmit at a rate of 50; and also (iii) flow S2 to D2 to transmit at a rate of 50. Then, the total network throughput is only 150 units, less than the previous maximum of 200, but at least all flows are equally served.

In one implementation, the MMF Regulator can be configured to allocate rates to flows according to max-min fairness, as described below.

Max-Min Fairness (MMF)

In one embodiment, the MMF Regulator can be configured to implement max-min fair (MMF) rate allocation, which can be defined as follows: equally distributing the available capacity of each network link to all the flows that pass though the network link and can use the network link; if some of the flows cannot use as much capacity as this allocated "fair share," then equally distribute any capacity that is left unused to the rest of the flows that pass through the link. An equivalent definition is that MMF is achieved by an allocation if an attempt to increase the allocation of any flow necessarily results in the decrease of the allocation to some other flow that had an equal or smaller allocation. The "max" in the name of MMF refers to the fact that it maximizes the "fair share" on each link; the "min" in the name refers to the property that the rate of each flow is the minimum of the fair share rates among all the links along the path of the flow. MMF maximizes the rate allocated to the flows that have the minimum rate in the network. The properties of max-min fairness (MMF) are discussed below in more detail.

Single-Path Versus Multi-Path Routing:

networks may have a topology such that there exist more than one path (routes) through the network from a given source node to a given destination node (for several or all of the source-destination pairs). In such networks, when a message is broken up into multiple packets in order to be transmitted from its source to its destination node, either (i) all packets of the message may follow the same route (path) through the network, called single-path routing; or (ii) different packets may follow different routes, called multi-path routing. Multiple routes may yield better network performance, but packets may encounter different delays through different routes, resulting in packets arriving out-of-order at the destination node.

To this end, in one embodiment of the MMF Regulator, all packets of a same flow follow a single, same path (route) through the network. This does not preclude multi-path routing from being used in the network, in other embodiments: when multi-path routing is used, each one of the different routes that packets can follow can be defined and treated as a separate flow. Thus, some transmissions through the network may use more flows (more paths) than other transmissions. In such cases, weighted max-min fairness, which will be described in greater detail below, can be used to compensate for potential inequalities in the number of flows used by the various network sessions.

Rate of a Flow on the Links Along its Path—the Bottleneck:

The network links along the path of a flow may be allocating different rates of transmission to the flow. However, this is neither useful nor desirable. When the outgoing rate of a flow out of a switch differs from the incoming rate (for the same flow into the same switch), there may be either accumulation or depletion of packets of this flow in the buffer memory of this switch. If the incoming rate is higher that the outgoing, there will be accumulation of packets, since more packets of the flow enter the switch than the number of departing packets, per unit time. On the other hand, an outgoing rate that is higher than the incoming can only be sustained for as long as there are packets of the flow that have been buffered in the switch, which will eventually be depleted if such a difference persists. Neither of these two conditions can persist indefinitely, since buffer memory in each switch is limited.

Looking at successive links along the path of a flow—where successive links are the input and the output of a same switch—having a higher rate (for this flow) in the upstream link than in the downstream link is useless, because the packets of the flow can reach the destination node at a rate not higher than the downstream link dictates, no matter how fast the upstream link pumps them into the switch. Furthermore, this situation is also undesirable since it results in packets accumulating in the network buffer memories, thus filling them up possibly creating congestion, as described above. In exemplary embodiment of the MMF Regulator, by applying this observation iteratively among all pairs of successive links along the path of a flow, the following assumptions can be made:

That a link along the path of a flow which is able or willing to allocate the minimum rate to this flow, among all the links on the path of this flow, should eventually dictate the rate of the flow. This minimum-rate link is referred to as the bottleneck link for the flow.

Since the links downstream from the bottleneck link may be willing or able to forward the flow's packets at a rate higher than the bottleneck link, there may usually be no (or very few) packets of the flow in the switch buffers downstream from the bottleneck link; the rate of the bottleneck link will get imposed on these downstream links by the lack of packets (of this flow) that get forwarded at any rate higher than the bottleneck rate.

If the links upstream from the bottleneck link forward packets (of this flow) at a rate higher than the bottleneck rate, then packets of the flow will keep accumulating in the network buffer memories upstream from the bottleneck link; this is the undesirable situation that was discussed above, since it consumes network memory resources and can eventually lead to congestion. In order to prevent such accumulation, all upstream links may be considered to observe the bottleneck rate, up to and including the source node (and link) of the flow. In fact, for accumulation to be prevented, it is necessary and sufficient for the source node to observe the bottleneck rate: if it does not, then accumulation will occur somewhere, and if it does, then no other link downstream from the source can transmit at a higher rate than this, hence no accumulations can occur. In one implementation, the MMF Regulator can determine the bottleneck link for each flow and inform the source of each flow about the rate allocated to the flow on that bottleneck link, so that each source regulates its transmission rate such that it does not exceed that bottleneck rate.

Rate Allocation on One Link:

Based on the above observation about the bottleneck link for each flow, fair rate allocation is described herein. "Fair," to begin with, may mean equal rate allocated to all flows. If a certain link L has capacity C and there are n flows passing through it, any rate $\leq C/n$, allocated to all flows passing through L, will be feasible (on L) and fair. Rates lower than $C/n$ are fair if equally allocated to all flows, but are needlessly restrictive in that they do not fully utilize the available capacity of L, thus needlessly restricting all flows to something worse than feasible. For both full utilization of the resources and fairness, a rate of $C/n$ can be allocated to all n flows passing through L, if we ignore the rest of the network.

The above "equal" allocation is only a first approach, because it ignores what goes on in the rest of the network. As observed in the previous subsection, it is both useless and undesirable to allocate to a flow any rate that is higher than the bottleneck-link rate for that flow. Thus, coming back to link L, several of the flows passing through L can happen to have their bottleneck link elsewhere, i.e., they can be restricted to a rate that is lower than $C/n$ by their passing through other links—presumably links with capacity $<C$ or with $>n$ flows passing through them, or both. For those flows passing through L with a bottleneck rate lower than $C/n$ (due to another bottleneck link), in one embodiment, L should allocate their bottleneck rate to each of them, based on the above observation. This lower allocation to a number of flows, leaves excess link capacity that is "unused" by those "bottlenecked elsewhere" flows. In order to still achieve full link utilization, this excess capacity can be equally distributed to the rest of the flows—that is to those flows for which this link L is their bottleneck—since they do not have another, worse bottleneck.

Hence, in one implementation, the MMF Regulator applies the following iterative rule to find the "fair" rate allocations to the flows passing through any one link L: (1) identify all "bottlenecked-elsewhere" flows passing through L, that is the flows for which their bottleneck link is not L; (2) for all these bottlenecked-elsewhere flows, allocate a rate to each equal to its bottleneck rate; (3) add up all these rates that have been allocated to the bottlenecked-elsewhere flows; (4) all other flows passing through L are "bottlenecked-here," i.e. L is their bottleneck link; (5) calculate the excess capacity of L that remains when subtracting the above sum of rates allocated to the bottlenecked-elsewhere flows from the capacity C of L; (6) equally divide this excess capacity of L to the bottlenecked-here flows to determine the Fair-Share Rate (FSR) for link L, that is, the equal rate that results and is allocated to each of the bottlenecked-here flows; (7) check the correctness of the original identification of the bottlenecked-elsewhere flows: the bottleneck rate for each of the bottlenecked-elsewhere flows should be lower than the FSR of L; if not, revise the original list by characterizing these flows as bottlenecked-here. The above steps are numbered for convenience; it should be understood that the MMF Regulator may be implemented in a different order and by one or a combination of different modules.

Max-Min Fair (MMF) Rates:

Conceptually, the max-min fair rates in an entire network could be determined as follows—which is too slow and too centralized to be practical. The bottleneck link of each flow would have to be determined. If the global state of the entire network were known, this could be done by starting with the global worst bottleneck link of the entire network, that is the link that has the lowest C/n value (as defined above) among all links of the network. Since this is the global minimum rate allocation, all flows passing through that global-worst link will be bottlenecked on that link, hence they will each receive that global minimum C/n rate allocation. Knowing the rate of these flows, and knowing that they are bottlenecked-elsewhere on all other links, their rate can be subtracted from the capacities of all other links through which they pass, and a new global-worst link can be found for the rest of the flows, and so on.

In a real network scenario, this procedure may be used off-line, by some central system having global knowledge of a network with slowly changing flows, but it is too slow and too centralized to be applied to networks with many and fast-changing flows.

To that end, in one embodiment, the MMF Regulator can approximate this calculation in a distributed, fast-responding, and low-cost way.

Figure 3:
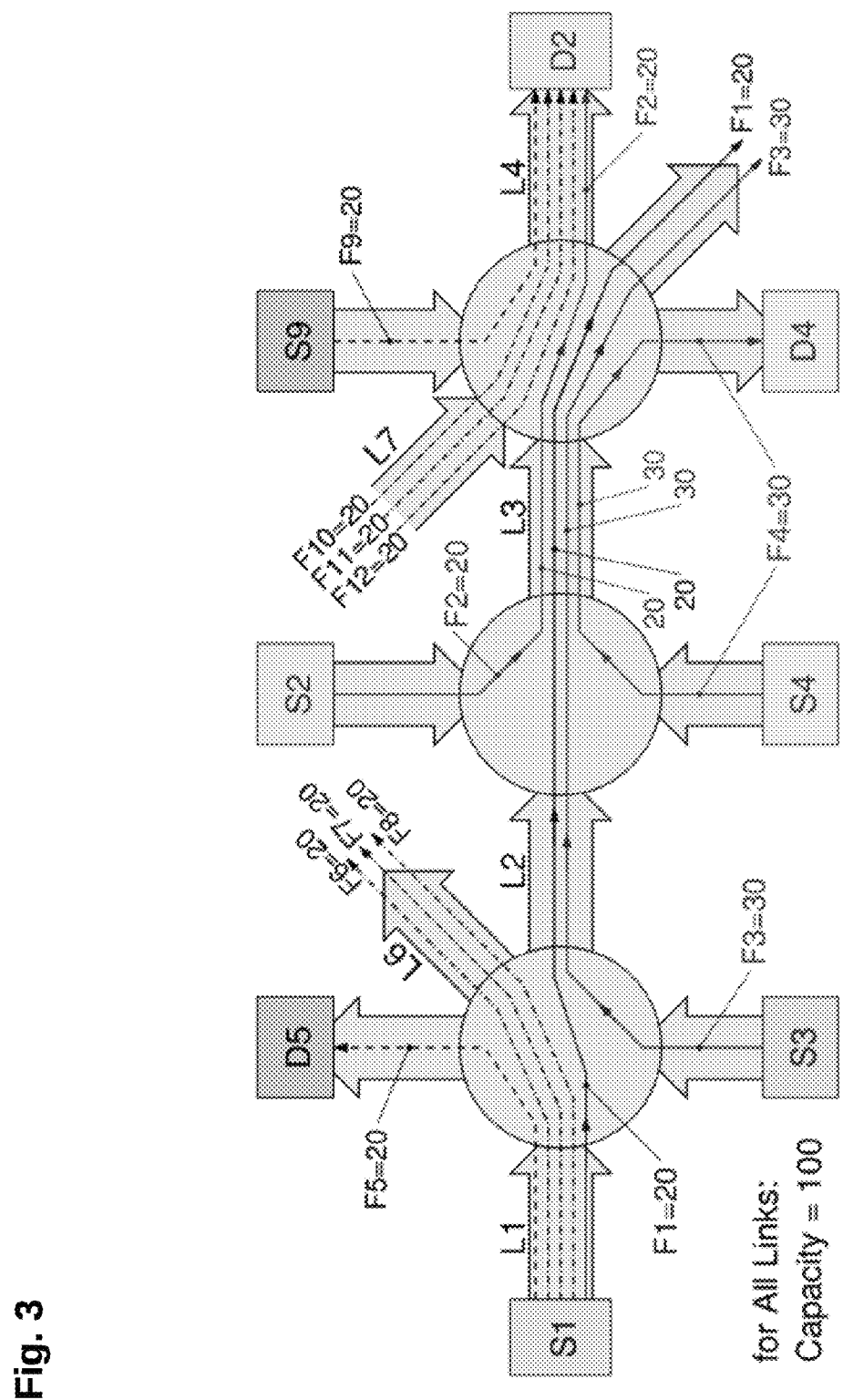
FIG. 3 shows example flows and max-min fair rates allocated to the flows, according to an implementation of the MMF Regulator.

FIG. 3 illustrates example flows and max-min fair rates allocated to these flows in one exemplary embodiment of the MMF Regulator. In this example, links are shown as short, fat arrows, switches are shown as circles, source/destination nodes are shown as rectangles, and flows are shown as long, thin arrows. In the exemplary embodiment shown in FIG. 3, all link capacities are assumed to be 100 units each.

As shown in FIG. 3, the globally most bottlenecked links are L1 and L4, because they each have 5 flows passing through. Note that the source S1 may not necessarily drive its link, L1, at peak rate all the time—here it is assumed that it does, i.e. the aggregate rate of all flows passing through L1 is 100 units. Owing to fair rate allocation, S1 drives each of the five flows that originate from it, F1, F5, F6, F7, and F8, at one fifth of its total capacity, that is at a rate of 20 units for each flow.

Destination D2, at the end of the other most bottlenecked link, L4, can normally accept traffic at the peak capacity of L4, unless it becomes overloaded and needs to throttle traffic down (which it can do, using the proper feedback information, in one embodiment of the MMF Regulator). In one exemplary embodiment, D2 is assumed to be prepared to receive traffic at its peak capacity of 100 units. For rate allocation to be fair, each of the five flows passing through L4 should each get 20 units of rate.

As shown in FIG. 3, four flows pass through link L3, which is the next most bottlenecked link. As shown, the four flows passing through link L3 include: F1, F2, F3, and F4. Equally dividing the capacity of L3 among these four flows, means that each flow can get 25 units of rate. However, flows F1 and F2 are bottlenecked elsewhere (on links L1 and L4, respectively), to a lower rate value of 20 units each. Thus, in one embodiment, the MMF Regulator causes L4 to allocate those 20 units to each of flows F1 and F2, which leaves 60 units free to be allocated to the rest of the flows. Those remaining flows F3 and F4, are not bottlenecked elsewhere, so they can equally share this excess capacity of 60 units, i.e. they can each be allocated 30 units of rate.

In this example, links L1, L3, and L4 are the only bottleneck and fully utilized links. All other links are utilized at less than peak capacity because the flows that pass through them are bottlenecked elsewhere. L2 is utilized at 50 units of rate, because only F1 and F3 traverse it, which are constrained at 20 and 30, respectively, units of rate, by their bottleneck links, L1 and L3 respectively. Similarly, L6 and L7 are utilized at 60 units each, the links of S3, S4, and D4 are utilized at 30 units each, and finally the links of D5, S2, and S9 are utilized at 20 units each.

In this example, rate regulation is simplest for the flows originating from S1, because their bottleneck is at their source—in fact, in such cases, rate regulation may be done automatically, by a source scheduler that decides which flow to send the next packet from. Rate regulation is hardest for flows F2, F9, F10, F11, and F12, because their bottleneck link is their very last link: if their sources are not effectively regulated, then these sources can inject excess packets into the network, which cannot exit the network as fast as they enter, thus causing congestion. Rate regulation is also challenging for flows F3 and F4, because their bottleneck (L3) is 3 and 2 hops downstream from the source, respectively.

To this end, in one implementation, the MMF Regulator can achieve rate regulation for these hard cases, where the bottleneck link is further downstream from its source, and controls rate regulation in such a way as to approach the max-min fair (MMF) flow rates, thus achieving both fairness and full utilization of the network resources (link capacities).

Principle of Operation:

In one implementation, the MMF Regulator can provide control instructions from the network to the sources of the flows in order for the sources to regulate the rate of each flow to a value not higher than the instructed or predetermined value. Such regulation may be desired in order to achieve substantially complete utilization of the highly-subscribed network links, while avoiding the negative effects of congestion, and without needing the network to maintain per-flow state or queues.

In one exemplary implementation, the sources of flows are assumed to be cooperative, i.e., the source flows abide by the control instructions that they receive from the network. In one implementation, the control instructions may be generated through a feedback mechanism, for example, the sources can inform the network about their flows and the actual as well as the desired rate of each of them; then, the network can calculate the desirable rates and instruct the sources of the flows to observe them. The network can perform such calculations on-the-fly, without maintaining per-flow state, by just maintaining a small number of registers and logic for each network link.

In one implementation, the rates that the network can instruct sources to regulate themselves to are an approximation to the max-min fair (MMF) rates. These rates can be calculated in a distributed, iterative, and approximate way. In one implementation, there is no central location, state, or calculation performed anywhere in the network—instead, the exemplary MMF Regulator can run based on the cooperation among all or selected switch-output ports and all or selected sources in the network. The MMF Regulator can operate based on the repetition of a set of calculations at periodic intervals. For example, if the set of flows passing through each link does not vary dramatically between repetitions of the calculation, that is, if flows are relatively long-lived, the calculation converges after a few repetition intervals to the approximate MMF rates for the flows. Even before converging to the MMF rates, the exemplary MMF Regulator can provide feedback control instructions that are efficient in limiting the negative effects of congestion, while also allowing the fast-start of flows, i.e., no delays in starting-up new flows and letting them run at reasonable rates from the beginning.

Operation when a Subset of the Switches or Links Participate:

In one implementation, the MMF Regulator can assume that all switches and all links of the network participate in the protocol described herein. In another implementation, the MMF Regulator can operate in the same way when, for example, a subset of the network or a subset of the links or a subset of the switches participate in (run) this protocol, as follows:

If a certain source does not participate, another network device (e.g., switch, router, bridge, etc.) downstream from it can play the role of source, provided that it is capable of differentiating the packets sourced from it into flows according to their destination (and path) and that it is capable to separately regulate the rate of each of these flows.

If a certain destination does not participate, another network device upstream from it can play the role of destination, by recognizing the protocol's fields in the packet headers, and providing the same feedback messages as the protocol requires that a real destination provide.

Links that are not fully utilized are free to not participate in the protocol because they never dictate any flow passing through them to be regulated to any rate different than the rate currently used by the link. To put it another way, such links that have excess (unused) capacity are never the bottleneck link for any flow, thus all flows passing through them are bottlenecked-elsewhere. Thus, if it is known or suspected or hoped that some links in a network can never be bottleneck links, then those links can be tagged to not participate in this protocol. In one implementation, such links can never modify the Current Rate (CR) or Desired Rate (DR) fields of the packets that pass through them, they can never generate any rate-change feedback information, and they do not need to maintain and update any estimated fair-share rate (FSR) value.

For the network links that wish to participate in the protocol of the MMF Regulator, there can be a choice as to whether the link's fair-share rate (FSR) value can be maintained and the protocol runs in either the upstream switch, which drives this link, or in the downstream switch, which receives the link's traffic. In one embodiment, the protocol may be run in the upstream switch, because this way the short-circuit rate feedback (as described below) can arrive earlier at the flows' sources. However, if the driving switch of a link happens to not participate in the MMF Regulator exemplary protocol, the protocol can be run in the link's downstream switch.

Rate Feedback: Minimum Fair-Share Rate (FSR) Along a Flow's Path

Regulating the rates of the flows in one implementation of the MMF Regulator is described in greater detail below. That is, assuming that the fair-share rate (FSR) number of each link is known, regulating the rates of the flows is described.

In one implementation, each source maintains a rate register for each flow that is sourced there, specifying the current rate at which this flow is allowed to transmit. Sources are not allowed to transmit the packets of any flow at a rate higher than that flow's register specifies for the flow, and, in general, may strive to transmit at precisely that rate. Rate register values can be updated as described. In one implementation, two kinds of corrective actions can be applied to these flow rates: (i) increase the rates, when the source so desires and the network can afford to do so; and (ii) decrease the rates, when the network says so, or if the source is forced to do so for its own, internal purposes. These cases will be described in further detail below.

Finding the Maximum Allowed New Rate for a Flow

In one implementation, the rate of each flow can be regulated to the minimum of the fair-share rates (FSR) among all links that the flow passes through, as described above. A flow's path includes the first link of the flow—its source link: the source may not desire to transmit a flow at a very high rate (e.g., because it is sourcing many flows, or because it is slow in generating data for this flow), so it may be acceptable for the source, i.e. the first link, to be the "bottleneck" for a flow, i.e. to have the minimum fair-share rate (FSR) among the links of the flow. In other cases, the bottleneck may be somewhere further downstream along the flow, and it may often be the very last link of the flow, the one reaching its destination, if the same destination is contended for by too many flows.

A flow may have been regulated, in the recent past, to a certain rate $R_{current}$ but circumstances are continuously changing in networks, and there may often be reasons why a source may desire to increase the rate of the flow, and the network may be able to accept that: (i) the source itself may have been the bottleneck in the past, but new circumstances may allow the source to be able and to want to increase its rate now; or (ii) the source may have always wanted to transmit at a rate higher than $R_{current}$ but the network may have imposed $R_{current}$—however, the load of the network fluctuates constantly, so that load may have dropped recently, and a higher rate may now be feasible for this flow.

In the former case, the network does not know the source's desire to increase its rate. And in the latter case, if the network does not maintain per-flow state, there is no way for it to have recorded the source's earlier desire to transmit at higher rate so as to notify the source when that becomes feasible. Thus, in both cases, the source may have to—once or periodically—request permission to transmit at a desired new rate, $R_{desired} > R_{current}$. The request may be sent once (or a first time) when the source was satisfied with $R_{current}$ in the past but now is not. Or else, the request can be sent periodically as long as the source is not satisfied with $R_{current}$ and desires a higher rate, and until that desire is satisfied by the network.

The Desired-Rate (DR) Packet Field, and how it is Treated:

In one implementation, a source is allowed to introduce into the header of any packet that it transmits a desired rate (DR) field, which is the (new or repeated) rate value at which the source desires to transmit, in the future, the packets of the flow that this packet belongs to.

In one implementation, when a packet containing a desired rate (DR) field traverses any switch in the network, the switch compares the desired rate (DR) value to the current fair-share rate (FSR) value for the output port that this packet will be forwarded on, i.e. for the outgoing, downstream link that this flow goes through. If DR>FSR, then the switch reduces the DR value so that it becomes equal to the FSR value. The end result of this is that, when the packet reaches its final destination node, the DR field of the packet will contain the minimum value among the FSRs of all links that this flow passes through, which is precisely the maximum allowed rate for this flow.

In one implementation, when a packet containing a desired rate (DR) field reaches a network destination node, that destination must send a feedback packet to the source of the flow that contains the final DR value as that value reached the destination; this field is called a new rate (NR) field. Such feedback can be advantageously combined with (piggy-backed into) other feedback packets that the destination periodically sends to the source, like acknowledgements of data delivery and/or correctness—provided that the destination does not excessively delay sending the NR feedback in anticipation for another feedback opportunity to arise.

In one implementation, when the source of the flow receives a feedback packet containing a new rate (NR) field, and if NR is lower that the flow's current rate register, then the source must decrease its rate register to the NR value, otherwise when NR≥current rate of the flow, the source is allowed to increase its rate register up to the NR value. Note that, under steady network traffic, NR is not expected to be lower than the flow's current rate, because the current rate was not higher than the minimum of the fair-share rates (FSRs) along the flow's path, and NR is again the minimum of those same FSRs and of desired rate (DR), where DR was higher than the current rate. However, since network traffic constantly fluctuates, hence the FSRs change, this NR may be the result of newer, reduced FSRs, hence it may carry to the source, new, more up-to-date rate regulation information, which the source is obliged to abide by.

Reverse Direction DR Packets:

An optimization can be for the minimum-finding process to operate in the reverse direction, i.e., from destination back to source. In one implementation, this can be possible when feedback/acknowledgement packets from the flow's destination back to the flow's source follow precisely the same route as the flow's forward packets, but in the opposite direction. When that condition is met, the reverse-direction-desired rate (DR) mechanism works as follows. At time intervals that the destination node is free to decide, e.g., whenever an acknowledgement packet is sent back to the source for any reason, the destination can also introduce a reverse-DR field into that feedback packet's header. The initial value of the reverse-DR field is the maximum rate at which the destination is willing and able to receive packets of this flow.

When a packet containing a reverse-DR field passes through a network switch, the switch compares the desired-rate (DR) value to the fair-share rate (FSR) value for the link that runs in the opposite direction relative to the incoming link for this packet, i.e. the link for the forward direction of this flow, since the reverse-DR fields are contained in packets that run in the backwards direction of the flow—which was assumed to go through the same path as the forward direction. If the reverse-DR value is larger than that FSR value, then the reverse-DR value is reduced so as to become equal to the FSR value. When the reverse-DR packet reaches the source of the flow, the source has to also perform the same minimum operation using its own FSR for the flow's forward direction. After that, the DR value that resulted at the source is the minimum of all the forward-FSRs for this flow, which is precisely the new maximum allowed rate for the flow.

The exemplary optimization has two advantages: (i) when the (reverse-) DR packet reaches the source, the minimum-FSR value that it contains is more recent than what the simple, forward-DR technique achieves; and (ii) the DR packet has traversed the network only in one direction (the reverse one), as opposed to both directions under the simple technique, hence less network traffic. For this optimization: (i) the feedback path route must be the same as the forward route; and (ii) the destination should be set to periodically and continuously transmit reverse-DR packets to the source, even when the source is not interested in increasing its transmission rate (unless a more complex handshake protocol is established, of the style "start/stop reverse-DR transmissions," or of the style "please send me one reverse-DR packet").

Using DR Packets for Finding Fast Enough Route:

Packets containing the desired rate (DR) field can also be used for another purpose, not linked with increasing the rate of an existing flow. In networks with multi-path routing (i.e. networks that have and allow more than one route from a given source to a given destination for at least some of the source-destination pairs), when a new flow is being set up, one of the decisions to be made is which path this flow should follow.

Under these circumstances, for the purpose of selecting the route of a new flow, the source (or an intermediate switch) may send a number of inquiry packets, containing the desired rate (DR) field each, along a number of candidate alternative routes; normally, these packets need not contain any payload. In one implementation, when the feedback for each of these inquiry packets arrives back at its source, it will contain the maximum-allowed rate along each of the alternative routes. The source (or intermediate switch) can then select the less loaded route, or a route that allows a sufficiently high rate of transmission for this flow.

Periodic Rate Feedback Needed for Lowering the Rate of a Flow

In one implementation, the MMF Regulator can use both desired rate (DR) fields in selected packet headers, as discussed in the previous section, and current rate (CR) fields in selected (others or the same) packet headers; this section discusses the use of the CR field, and its relation to the DR field.

The Dual Role of CR—Need for Periodic Rate Declaration and Feedback:

The DR field, discussed above, is used when a source desires to request permission to increase the rate of a flow. This is an optional, source-initiated action: as long as a source is satisfied with the current rate of a flow, it does not need to ever issue any DR fields in that flow's packets.

On the other hand, in one implementation of the MMF Regulator, the current rate (CR) field, discussed here, needs to be issued periodically, on a regular basis. In one implementation, the CR field has a dual role: (i) it serves as a periodic declaration that a flow is present in the links that it passes through, and that the flow's current rate is as stated, for the purpose of periodically updating the fair-share rate (FSR) estimate for each of those links as can be discussed below; and (ii) the CR field is needed for the network to be able to instruct a source to reduce the rate of a flow when network load increases and thus the rates of (some or all) flows need to be reduced. The latter function of the current rate (CR) field can also be served by the desired rate (DR) field, but not the former function and not the short-circuit operation.

In one implementation, the exemplary MMF Regulator can economize on switch complexity by not requiring the switches to maintain any per-flow state (information). This implies the need for periodic transmission of current rate (CR) information, on a regular basis, for all flows, for both of the above functions to be performed, i.e., fair-share rate (FSR) updating and flow rate reduction. In one implementation, the exemplary MMF Regulator estimates and updates the FSRs periodically because of the changing network traffic circumstances. To update the FSRs, in one exemplary embodiment, the MMF Regulator requires each flow to identify itself and to state its current rate, as further discussed below.

As for rate reduction, the situation is as follows: in one implementation, while rate increase is an optional, source-initiated action, rate decrease is a compulsory, network-initiated action. Reducing the rate of a flow is needed whenever network load becomes heavier (on the links that the flow traverses), which can happen when new flows open or when relatively small flows increase their rate (up to their fair share) because circumstances changed in other ex-bottleneck links of such small flows. In one implementation, when traffic load becomes heavier and some sources must be instructed to reduce the rate of some of their flows, there may be no information inside the network, under one implementation, that can identify the flows to which the rate-reduction applies and their sources for sending such instructions to, because, under one implementation, the system may not keep any per-flow information (state) inside the network. Thus, in one implementation, each flow periodically, on a regular basis, determines whether it can still keep transmitting at a given rate. The current rate (CR) field in packet headers serves this purpose.

In one implementation, the periodicity at which the current rate (CR) field needs to be included in packet headers results from this function: when traffic becomes heavier, the sources that need to reduce their rate can learn about this—and hence actually reduce their rate—on the next occasion when a packet of their flow includes a CR field and thus the sources receive feedback informing them about their new maximum allowed transmission rate, as discussed in the next subsection. Thus, the worst-case response delay to the need for a flow's rate-reduction is equal to the period at which this flow includes current rate (CR) fields in its packet headers (plus the delay for the switches to update the fair-share rate (FSR) estimates for the links, after the traffic load has changed).

The Current-Rate (CR) Packet Header Field, and how it is Treated:

In one implementation, all flow-and-rate packets (FRP) must contain a current rate (CR) field in their header. In addition, any other packet may be allowed to contain a CR field. Every source of every flow ensures that CR fields appear in packet headers on a regular, periodic, and frequent enough basis; since FRP's can also be transmitted on a regular, periodic, and frequent basis, usually this requirement can be met if just the FRPs contain CR fields. The CR field contains, at the source, the rate value (number) at which the source is currently transmitting the packets of the flow that this packet belongs to.

In one implementation, network switches use the current rate (CR) fields in flow-and-rate packets (FRPs) as described below. In addition, network switches modify the CR field of any packet (including FRPs) in the same way as they do for the desired rate (DR) fields: they compare the CR value to the current fair-share rate (FSR) value for the link that this flow goes through, and, if CR>FSR, then the switch reduces the CR value so that it becomes equal to the FSR value. Thus, when the packet reaches its final destination node, the CR field of the packet will contain the minimum among the flow's current rate (initial value of CR) and the FSRs of all links that this flow passes through. The destination node, when receiving such a packet, sends a feedback packet to the source of the flow containing a new rate (NR) field, equal to the final current rate (CR) value that reached the destination.

In one implementation, when the source of the flow receives a feedback packet containing a new rate (NR) field, if NR is lower that the flow's current rate then that source must decrease its rate register to the NR value. Note that feedback packets containing NR fields also result from desired rate (DR) packets, thus it may also happen that NR current rate (CR), in which case the source is allowed to increase its rate register up to the NR value, as already discussed above.

End-to-End Versus Short-Circuit Rate Feedback:

Under non-extraordinary circumstances, network load can change at a mild pace, and thus corrections to the rates at which flows are being regulated can be performed with some time margin. This covers the usual case of current rate (CR) fields in flow-and-rate packets (FRP). However, in some cases, network load may vary suddenly and/or large rate reductions may be desired. This can be particularly true (i) when very few (or no) flows were passing through some link, and a new flow starts that traverses that link; and (ii) when a new flow starts transmitting at its desired rate, which happens to be much higher than its fair rate along its path, and until the source of the flow gets informed about that (much lower) fair-share rate.

In order to be able to quickly react to such sudden changes, some embodiments of the MMF Regulator can include a number of optional optimizations, as discussed below. One of these is related directly to what switches do when they process the current rate (CR) field of a packet, and it is as follows: In one implementation, rate regulation through the CR fields works in an end-to-end fashion: the source (one end-point of the flow) places the CR value inside some packets, that value gets reduced along the flow's path whenever the packet passes through links with lower fair-share rates (FSRs), the CR reaches the flow's destination (the other end-point), and then that destination node generates a new rate (NR) feedback packet, that packet travels back through the network, and when it reaches the source then the rate correction can be eventually applied to the flow. This end-to-end delay in actually applying rate corrections can be acceptable in the usual cases of mild network load changes, but may be slow in cases of sudden changes in network load conditions.

For these reasons, an optional optimization according to an implementation of the MMF Regulator provides short-circuit rate feedback; this works as follows: When a switch processes a packet that contains a current rate (CR) field, it compares the CR value against the fair-share rate (FSR) value for the link that the packet is about to traverse. When the CR value is much higher than the FSR value, i.e., higher by more than a given threshold, it means that this flow should be urgently notified to reduce its rate. In order to provide such urgent notification, the network may not wait for the end-to-end notification mechanism to work, but can, in addition, immediately send an early notification as well. Thus, the switch that has seen such a large discrepancy between the CR and FSR values can immediately generate a new rate (NR) feedback packet, similar to those normally generated by destination nodes, and send that back to this flow's source. The threshold involved in deciding that such urgent notification can be sent is a tuning parameter according to an implementation, which can be adjusted based on the particular circumstances of the network where an exemplary MMF Regulator algorithm is applied; as an indicative number, a threshold on the order of about 20% of the fair-share rate (FSR) value can be used, for example.

When to Use CR, when to Use DR, and when to Use Both:

In one implementation, desired-rate (DR) fields are used in rate regulation, whenever a source desires to increase its rate. Current-rate (CR) fields are used (i) for fair-share rate (FSR) calculations by the switches; and (ii) in rate regulation, for finding out if the rate of a flow must be decreased. The MMF Regulator can determine when to use CR, when to use DR, and when to use both, in a packet, as explained below.

In one implementation, flow-and-rate packets (FRPs) must be transmitted periodically and on a regular and frequent basis by each source, for each flow, and they must contain a CR field. (DR cannot do, because FSR calculation needs actual rates). Thus, besides for FSR calculation purposes, these packets can suffice for "downwards" rate regulation purposes too, hence there may be no need for CR fields in any other packet (flow open and close packets also can contain a CR field, these packets can be considered as special case FRPs).

In one implementation, desired rate (DR) fields are needed because, without them, source rates would not be able to increase again, after any temporary decrease. DR fields can be inserted into any packet that a source desires to. Thus, they can be placed in flow-and-rate packets (FRPs), in addition to the current rate (CR) field that FRPs must contain. Such placement has the advantage that a single new rate (NR) feedback will be generated at the destination; on the other hand, such placement has the disadvantage that the packet header will contain two extra fields, both CR and DR. Alternatively, DR fields can be inserted into other, non-FRP packets. A third alternative is reverse-direction DR, as explained above.

In one implementation, at the destination node, both desired rate (DR) and current rate (CR) fields can be turned into a new rate (NR) feedback field, which, when reaching the source, becomes the new rate of the flow, with a compulsory decrease/optional increase in functionality as already discussed.

In one implementation, when a packet reaches its destination, the current rate (CR) field's first purpose, to participate in the fair-share rate (FSR) calculations for this flow's links, has been accomplished. Thus, at the destination, only the rate-regulation function is important any longer. For rate regulation purposes, both desired rate (DR) and current rate (CR) fields will end up at the flow's destination not being higher than the minimum fair-share rate (FSR) along the flow's path; the difference of the two is that CR will also not be higher than the flow's current rate, while DR may be higher than the flow's current rate. It will be understood, however, that, for rate-regulation purposes, only the minimum FSR along the flow's path is important: this is the rate that the flow is entitled to on its bottleneck link. Thus, at the flow's destination, the CR value is a conservative indication for the flow's allowed rate. The CR value will be the minimum of the flow's allowed rate (the bottleneck link FSR) and the flow's current rate. Instead, DR is the proper value for rate regulation purposes, since DR is the minimum of the flow's desired rate and the flow's allowed rate.

Hence, in one implementation, when both current rate (CR) and desired rate (DR) fields are contained in the same packet and that packet reaches the flow's destination node, the new rate (NR) value in the feedback packet should be equal to the value of the DR field.

FSR Calculation: Counting Flows and their Current Rates

As explained above, in one exemplary embodiment of the MMF Regulator, rate regulation works by finding the minimum among the fair-share rate (FSR) values of the links through which a flow passes, and regulating that flow's source rate to this minimum value. This section discusses how to estimate and keep updating the FSR values for each network link.

The MMF Regulator achieves this without keeping any per-flow state in the network switches; since the number of flows passing through the switches can be large, this property of the MMF Regulator amounts to significant cost savings. If per-flow state were kept in the switches, i.e. if every switch knew the set of flows passing through it and the current rate (CR) of each of them, then finding the fair-share rate (FSR) for each link would be straightforward: equally divide the link capacity by the number of flows passing through it, thus finding a first FSR value, and then iteratively fix that to account for bottlenecked-elsewhere flows: for each flow with CR<FSR, allocate equally its excess capacity to the rest of the flows. However, the MMF Regulator does not record the set of flows or the current rate (CR) of each of the flows; packets containing CR fields do pass through the links, so we can count and process them, but this does not suffice by itself, since the system would not know, in general, which packet belongs to which flow.

One novelty of the MMF Regulator is that it provides a mechanism for each flow to be counted exactly once during each reevaluation of the fair-share rates (FSRs), as discussed in detail in the next section. Another novelty of the MMF Regulator is that it estimates the FSR in an approximate and adaptive way, using the FSR estimate of the previous time period, so as to only need to process the current rate (CR) values on-the-fly, without needing to record each of them in order to later be able to go back and perform corrective computations based on past-seen CR values; as will be explained below.

The Global Rate Reevaluation Period and Flow Identification

In order to be able to identify flows and to count them and their current rate (CR) of transmission exactly once each, during every reevaluation of the fair-share rates (FSRs), the MMF Regulator may specify that the source of each and every flow shall transmit exactly one special packet, called a flow-and-rate packet (FRP), containing at least the current rate (CR) field, and this is done: in each and every one of regularly and periodically repeating time intervals that are defined in synchronization among all flow sources in the network, in such a way that all the switches in the network are able to distinguish the set of flow-and-rate packets (FRPs) for all flows for a current period, from the FRPs of a previous period. The period of these repeating time intervals is called the rate reevaluation period (RRP). In one exemplary embodiment, the MMF Regulator may operate with more than one RRP defined in the network, as described below.

The basic idea for implementing this specification is to define the rate reevaluation period RRP duration as a globally agreed upon constant, or set of constants, for the entire network. If each flow source transmits its FRPs equally spaced in time by this global RRP constant, and if all these flow-and-rate packets (FRPs) travel through the network with the same delays, then all switches along their path will see them equally spaced by RRP in time, and thus the switches will see precisely one FRP for this flow in each and every RRP time window. In practice, there are two problems with this: (i) FRPs that happen to pass by a switch at times (phases) very close to the boundaries between successive RRPs may be counted sometimes before and sometimes after such boundaries, due to time jitter, thus affecting the correctness of flow counting; and (ii) the delay of individual packets and individual flows through the network can vary widely, hence downstream switches will often see the FRPs of a given flow not equally spaced in time, thus again affecting the correctness of flow counting. The next section (RRP Synchronization, and Bounding the Delay of FRPs) presents examples of ways to resolve these problems.

The choice of the specific value for the global rate reevaluation period (RRP) constant is a tradeoff between fast response to changing traffic conditions, on one hand, and overhead in the number of transmitted bits, on the other hand. The fair-share rate (FSR) estimates for the links are updated after each RRP; thus, for the FSRs to be more up-to-date, a short RRP value is preferred. On the other hand, each flow must transmit the extra FRP fields (most importantly the current rate (CR) field) in one of its packets during each and every RRP interval, thus adding the corresponding overhead to the number of bits that have to traverse the network; in order to minimize this overhead, a longer RRP value is preferred. If there exist flows with rates lower than one packet per RRP, then such low-rate flows will not even have—or be allowed to send—a single packet in some of the RRP time windows. In one embodiment of the MMF Regulator, such flows will transmit an empty-payload flow-and-rate packet (FRP) during the RRPs described above; an entire FRP, even with zero payload, contains significantly more bits than the extra FRP header fields when these are piggy-backed into a normal packet with useful payload, thus such low-rate flows contribute to an increased overhead. The embodiment of the MMF Regulator with multiple RRP values that is described below resolves this problem. Lastly, one of the methods discussed in the next section calls for all FRPs to be zero-payload packets; if this method is used, then the extra-bits overhead for the network will be increased, thus calling for longer rate reevaluation period (RRP) values.

As a first example, consider that in one implementation, the flow-and-rate packet (FRP) fields cost two extra Bytes in the packet header and that all of them are piggy-backed inside normal packets most of which carry a 256 Byte payload, as would result e.g., from flows that carry many Kbytes or more of data each. In that case, the traffic-volume overhead of FRPs would always be less than 2/256, i.e. less than 1%, independent of how short of a rate reevaluation period (RRP) is chosen.

As a second example, at the other end of the spectrum of choices, consider another implementation where all flow-and-rate packets (FRPs) are zero-payload packets, of size 20 Bytes each. Assume that the average number of flows per link is 32. Then, per rate reevaluation period (RRP), there will be an average of 32 FRPs, of 20 Bytes each, passing through each link, i.e. a total of 640 Bytes of FRP overhead per RRP. If we want this overhead to be no more than 4% of the link's capacity, then the RRP should be at least as long as 640/0.04=16 Kbytes equivalent. If this is a 10 Gb/s link, then the transmission time of 16 Kbytes will be 12.8 microseconds. Thus, an RRP of 13 μs or more will ensure an FRP overhead of less than 4% even in this unfavorable setup where all FRPs are zero-payload packets. For comparison, in such a setup, a heavy flow that occupies 40% of link capacity will have a duration of e.g., 32 μs or more, i.e. a few RRPs or more, if that flow carries 16 Kbytes of data or more.

As this latter example illustrates, what pushes the rate revaluation period (RRP) up is the presence of a large number of flows per link. If the number of flows is large, then most of the flows must be of low rate, or else the capacity of the links would be exceeded. Low-rate flows tend to last longer and to have smoother rate fluctuations; both of these properties are compatible with long RRP durations. The only problem, then, is the parallel presence of a few heavy flows sharing the same links. The heavy (high-rate) flows may be shorter-lived and their rate may fluctuate faster, thus needing shorter RRP durations in order to capture their variability. The solution then is to define multiple RRPs, co-existing in the same network, as described later in this disclosure.

RRP Synchronization, and Bounding the Delay of FRPs:

The previous section stated the general concept of flow and rate counting as to (a) define a global constant rate reevaluation period (RRP), and (b) arrange so that all flows periodically transmit flow-and-rate packets (FRPs) equally spaced in time by the RRP among themselves. As discussed above, though, in practice this has the problems of (i) arbitrary phases of when each FRP is transmitted, even if all of the packets are transmitted with the same period, RRP; and (ii) variability of the delays between when each FRP is generated and when it reaches downstream switches.

One method to resolve these problems, as implemented by the MMF Regulator, is for all flow sources to transmit their flow-and-rate packets (FRPs) not only with the same rate reevaluation period (RRP), but also with the same phase, i.e. synchronized in time. Thus, in one MMF Regulator implementation, all source nodes and all switches have a timer each, and these timers are kept synchronized among themselves, for example using periodically exchanged control messages. These synchronized timers define the boundaries between the successive rate reevaluation periods (RRPs), so that these boundaries are synchronous across the entire network (within a tolerance that is a predetermined percentage of the RRP). Then, for example, one implementation may arrange that all flow sources transmit one FRP for that flow during the first half of each RRP; if the maximum delay of an FRP across the network is half an RRP, then we are guaranteed that all switches will see all FRPs of each one RRP before that RRP finishes and the next RRP starts. Other implementations may agree on percentages that are different than half-and-half for the first and the second of the above two phases, FRP generation and FRP propagation.

Bounding the delay of all flow-and-rate packets (FRPs) through the network, so that these packets reach all switches along their path in the same rate reevaluation period (RRP) in which they were generated may not be straightforward, especially for short RRPs and large networks. One solution is for FRPs to be zero-payload packets and to have higher-priority than non-FRPs. Then, since the number of FRPs per link and per RRP is relatively low (it is equal to the number of flows), since their size is small, and since they are forwarded at high priority, the above maximum delay will usually be easy to guarantee. A further positive contribution comes from the multiple-RRP scheme described below whereby the many low-rate flows use longer RRP than few high-rate flows.

The above solution may be expensive, since it requires all flow-and-rate packets (FRPs) to be zero-payload packets, hence the FRP fields cannot be piggy-backed inside otherwise-useful normal packets. This may not be necessary for networks that can afford out-of-order delivery of normal (non-zero payload) packets (e.g. as may be true for remote-DMA (Direct Memory Access) flows, and/or as also happens with multi-path routing). In such networks, FRPs can be normal (non-zero payload) packets and still be transmitted at higher-priority. High priority will oftentimes deliver them earlier than their non-FRP counterparts, hence out-of-order relative to their non-FRP counterparts, the network can often tolerate that. Then, the upper bound to FRP delay can be guaranteed owing to their high priority, and traffic-volume overhead is also kept low since FRP fields are piggy-backed inside otherwise-useful normal packets.

Flow and Rate Counting

The notion of a bottleneck link has been described, and exemplary embodiments for regulating flow rates to the fair-share rate (FSR) of the bottleneck link—the minimum FSR link along the path—has also been described. Normally, in order to determine the true FSR value of a link, it would be necessary to sort the current rate (CR) values of all the flows on that link, from small to large, and then, if the sum of all CR values exceeds link capacity, start reducing the rates of the largest flows to the point where all the largest rates are equal to each other and the aggregate rate of all flows does not exceed link capacity. However, such a sorting and calculating is expensive to be performed in hardware and at high speed, so approximations may be used as an alternative, assuming that flows and rates do not vary too rapidly relative to the rate reevaluation period (RRP) or that the optimizations described below are used, and that the calculation will approach the true fair-share rate (FSR) after a few RRP iterations.

This section discusses the counting of flows and their rates that the MMF Regulator may perform, in one implementation, during each rate reevaluation period (RRP), of the previous section, in order to achieve the above approximation. The first subsection below introduces the main idea, and also defines two tuning parameters that may be used by the MMF Regulator: the safety margin that defines the usable link capacity, and the margin relative to the fair-share rate (FSR) that is used to derive the threshold against which to the current rate (CR) of the flows may be compared. The next subsections give an understanding of how the dynamics of flow counting and fair-share rate (FSR) evolution work. The last subsection of this section summarizes and defines how the flow and rate counting works, during each RRP.

Figure 4:
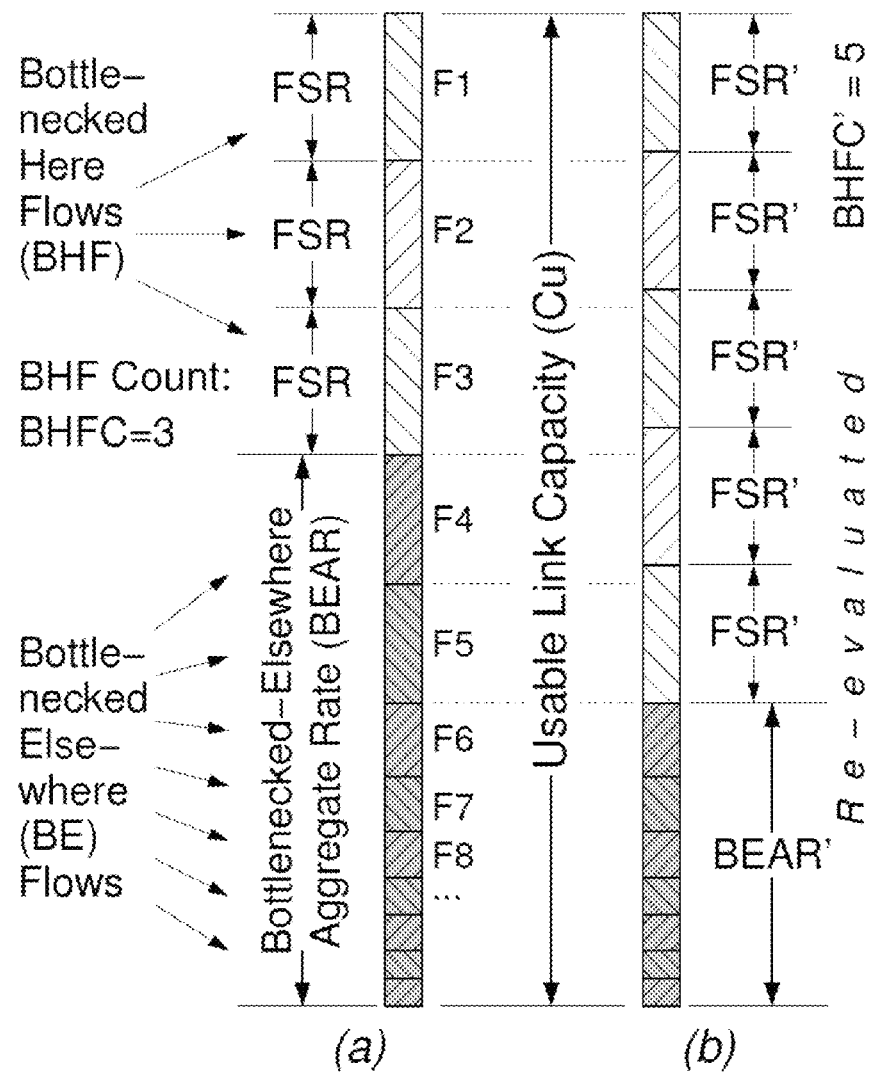
FIG. 4 shows an example of a link according to an implementation of the MMF Regulator, illustrating the change in data flows when traffic gets heavier.

Usable Link Capacity, and Comparison Threshold for Flow Rates:

FIG. 4 illustrates an example of flows and their current rates (CR) on a network link. The vertical axis corresponds to rate. The total height of the figure corresponds to the Usable Capacity of the link, $C_u$. This is the total capacity of the link under consideration minus a safety margin. This safety margin may be a tuning parameter used by the MMF Regulator. In one implementation, it corresponds to the fact that, in order for the queues in the network switches not to grow too large, the network cannot use the totality—but only a large majority—of the capacity of each network link. Networks that employee lossless flow control and other methods for congestion management (e.g. per-flow queueing) are able to reach up to 90 to 98 percent utilization of link throughput. Thus, a suggested value for the safety margin is on the order of 10% of link capacity, i.e. $C_u$=0.90×Total Link Capacity (C). Well-tuned networks are expected to be able to use a safety margin on the order of only 5%, while robust operation with only short queues in the switches may need to use a safety margin of 20 percent or more.

In FIG. 4, flows are shown sorted by rate, with lower-rate flows appearing below higher-rate flows, for the sake of clarity only. In reality, no mechanism is needed or provided for actually performing any such sorting. In part (a) of FIG. 4, flows F4, F5, F6, . . . , shown in grey, at the bottom, are bottlenecked elsewhere (BE): their bottleneck link is another one, not this present link, and that other bottleneck link constrains each of them to a current rate lower than the current fair-share rate (FSR) on this link. In this example part (a), besides the BE flows, there are also three bottlenecked here (BH) flows, F1, F2, F3, shown at the top, equally sharing among themselves all the excess capacity of the link. We call BHFC the count of the BH flows (bottlenecked here flow count); and we call BEAR the sum of the rates of the BE flows (bottlenecked elsewhere aggregate rate). Thus:

$$FSR=(C_u-BEAR)/(BHFC)$$

where $C_u$ is the usable link capacity; i.e., the BH flows, whose number is BHFC, equally share the part of the capacity of the link that is left unused by the BE flows, $C_u$−BEAR. Thus, the basic idea of the flow and rate counting that is repeated on every rate reevaluation period (RRP) is: for the flows whose CR<$FSR_{previous}$ (BE flows), accumulate their CR values in order to come up with the BEAR value; for the flows whose CR≈$FSR_{previous}$ (BH flows), count their number, amounting to BHFC.

The problem to solve with this counting is that both the fair-share rate (FSR) and the current rates (CRs) of the flows are all approximate values, and that they vary continuously. Thus, the comparison between the CR of each flow and the $FSR_{previous}$ of the link must be done carefully: since CRs should all be no greater than $FSR_{previous}$ (if rate regulation works well), and since CRs and FSR are approximate, the comparison CR<$FSR_{previous}$ should be approximate and not exact:

BE flow ⇔ CR<Threshold=$FSR_{previous}$−small margin, and

BH flow ⇔ CR≥Threshold=$FSR_{previous}$−small margin, where "small margin" is a tuning parameter according to an implementation, which can be adjusted based on the particular circumstances of the network where the MMF Regulator is applied; as an indicative number, a margin on the order of about 20% of the FSR value can be used, for example.

Examples of fair-share rate (FSR) reevaluation are given below, which may be performed on every rate reevaluation period (RRP)—in various cases, first in cases where the set of flows remains the same but flow rates vary, then in cases where new flows appear through the link, and last in cases where some of the previously existing flows have terminated. Two subcases will be examined below, assuming there is a constant set of flows: the traffic gets heavier and fair-share rate (FSR) drops, or the traffic gets lighter and fair-share rate (FSR) increases.

FSR Decrease when Some Flows Become Heavier

The fair-share rate (FSR) decreases when the traffic becomes heavier. This may happen either when new flows appear through the link as discussed above, or when the rate of some of the existing flows has increased, as discussed here, or both. The rate of the bottlenecked-here flows (BHF) cannot increase without FSR increasing, because these rates are constrained to be no higher than FSR. Thus, the only existing flows for which rate can increase are the bottlenecked-elsewhere (BE) flows. In the example of FIG. 4, assume that the rate of BE flows F4 and F5 has gradually increased (because traffic at their other bottleneck link grew lighter), to the point where now, in part (a) of the figure, these rates have approached the FSR value on this link.

Then, part (b) of FIG. 4 illustrates what will happen after fair-share rate (FSR) reevaluation: assuming that the rate of F4 and F5 has grown to be above the threshold used for the reevaluation, i.e. within the "small margin" of the previous FSR, these two flows will be categorized as BHF during reevaluation. This results in a new FSR' in (b) that is slightly lower than the previous FSR of (a).

FSR Increase when Some Flows Become Lighter

Figure 5:
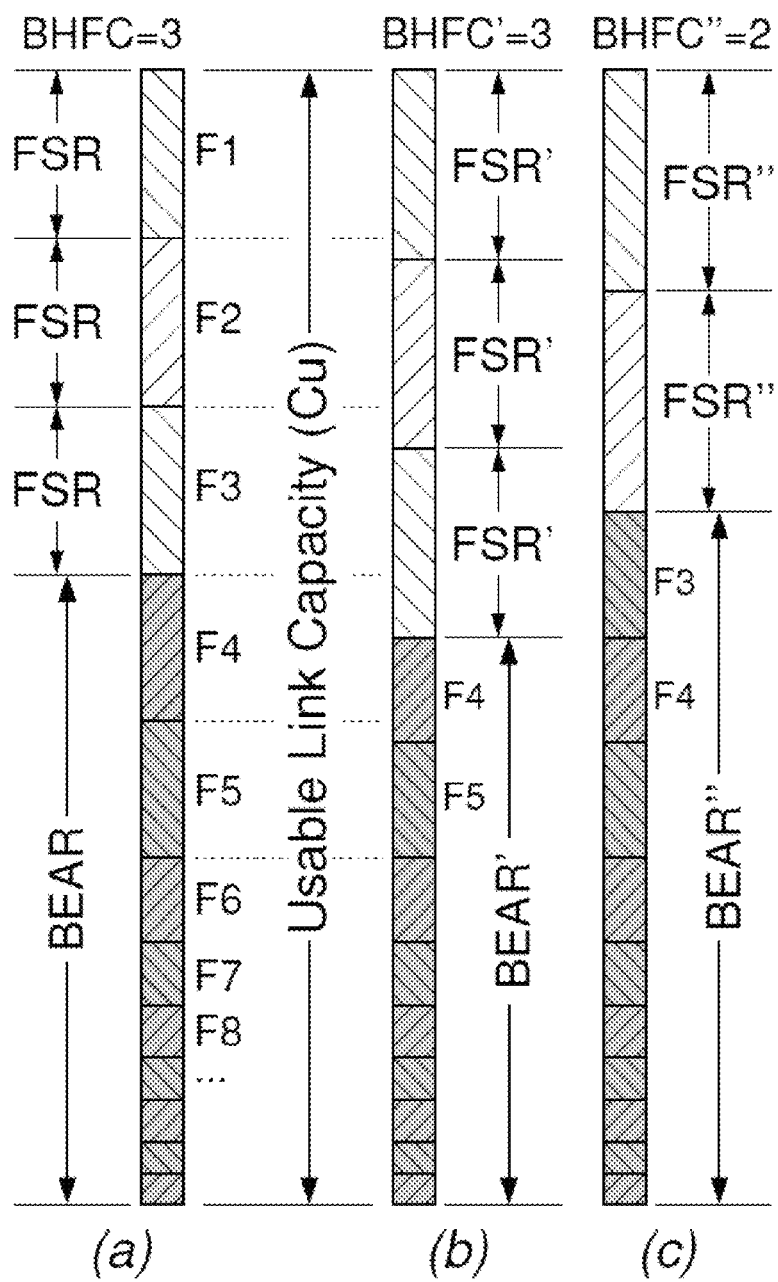
FIG. 5 shows an example of a link according to an implementation of the MMF Regulator, illustrating the change in data flows when traffic gets lighter.

FIG. 5 shows an example of the other case: starting from a situation (a) that is the same as in part (a) of FIG. 4, now it is assumed that flows F4 and F5 have been reduced—presumably because traffic got heavier at their bottleneck link, which is elsewhere—and that this rate decrease of F4 and F5 occurred during the rate reevaluation period (RRP) after (a). Thus, when the fair-share rate (FSR) gets reevaluated, in part (b) of FIG. 5, the aggregate rate of all bottlenecked-elsewhere (BE) flows, BEAR', is found smaller than in (a), given that, during reevaluation, each flow, hence F4 and F5 as well, declare their current rate (CR) and all CRs that are below the threshold (as described above) are added up in order to give the new BEAR'. This reduced BEAR', when subtracted from the usable link capacity $C_u$, and divided by the count of bottlenecked-here flows, which has remained constant at BHFC=3 (accounting for flows F1, F2, and F3), yields a higher new fair-share rate, FSR', thus allowing F1 through F3 to grow, taking advantage of F4 and F5 having become lighter.

The fair-share rate (FSR) can increase even further, still without any flow having terminated, when bottlenecked-here flows become bottlenecked-elsewhere, because traffic gets heavier at another link through which they pass or because FSR here has grown higher than the FSR of such other links. Thus, as shown in FIG. 5, after time (b), assume that F3 became bottlenecked-elsewhere, to the point where, upon reevaluation at time (c), the current rate (CR) of F3 has become lower that the threshold. Thus, F3 now is categorized as bottlenecked elsewhere (BE) flow, and its CR is added into BEAR". At the same time, only F1 and F2 are now found with a CR above the threshold, and thus BHFC" is now found to be 2. The new BEAR", although higher than BEAR', when subtracted from usable link capacity $C_u$, but divided by BHFC"=2 rather than BHFC'=3, now yields a higher fair-share rate, FSR", because of the reduced rate of F3.

FSR Decrease when New Flows Appear

Figure 6:
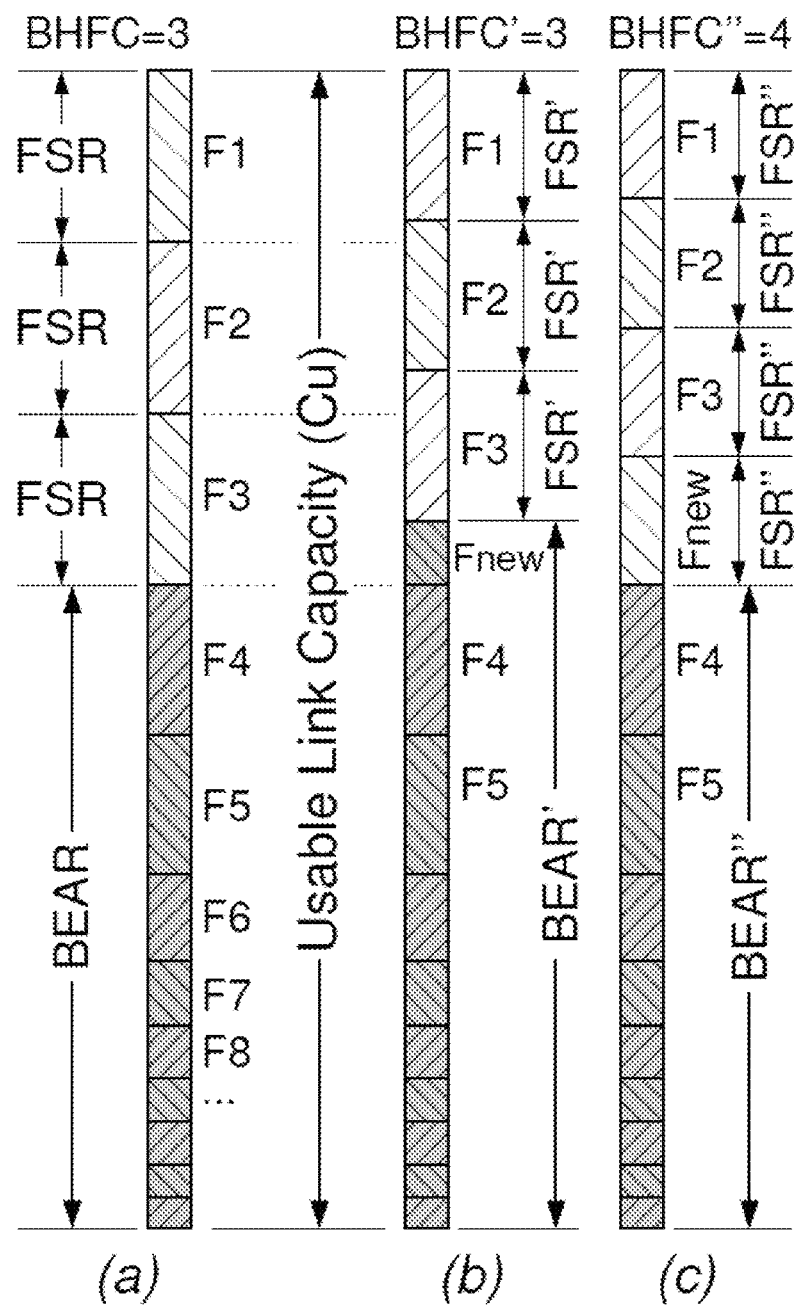
FIG. 6 shows an example of a link according to an implementation of the MMF Regulator, illustrating the effects on the flows within the link when a new flow appears within the link.

FIG. 6 illustrates the case where new flows start traversing the link, where $F_{new}$ appears and changes the state of the link from (a) to (b) or to (c)—for simplicity, state (a) here is the same as in FIG. 4(a). The new flow(s) make traffic heavier, and hence reduce the fair-share rate (FSR); this is a different FSR decrease than described in reference to FIG. 4, where the existing traffic became heavier without new flows appearing through the link.

Part (b) of FIG. 6 shows the case where $F_{new}$ is a relatively small flow, with a rate less than the fair-share rate (FSR) of this link, hence a bottlenecked-elsewhere (BE) flow. In that case, its rate is added to the link's BE aggregate rate: BEAR'=BEAR+CRF$_{new}$ while the count of bottlenecked-here flows, BHFC, remains the same, at 3. As shown in FIG. 6, this results in a reduction of the FSR by the rate of $F_{new}$ divided by the bottlenecked here flow count (BHFC).

Part (c) of FIG. 6 shows the case where $F_{new}$ is a relatively large flow, with a rate greater or equal to the fair-share rate (FSR) of the link, hence a bottlenecked-here (BH) flow. Because rates higher than FSR are not acceptable, the source of $F_{new}$ will be notified to reduce its rate to the FSR of this link—actually the new FSR" (this notification will be immediate if the optimizations described below are used, or else it will occur at the next current rate (CR)/desired rate (DR) transmission, as discussed previously. Part (c) of the figure shows the link state after or assuming that the rate of $F_{new}$ has been reduced to FSR". Here, assuming that the BE flows have not changed, the remaining capacity of the link after the BE flows have been subtracted, $C_u$–BEAR, is equally shared (divided) among the BH flows, which are now one more than before: FSR"=($C_u$–BEAR')/BHFC", where BEAR"=BEAR.

FIG. 6 has been drawn assuming that (i) the rate of none of the bottleneck elsewhere (BE) flows has changed, (ii) we know the rate of the new flow, $F_{new}$, and (iii) the new fair-share rate (FSR) is instantly reevaluated—before the next FRP procedure. This is the reevaluation of FSR that is performed under the "Fast Response" optimizations described in a later section; otherwise, a new FSR will result at the next per-RRP reevaluation, as discussed throughout this and the next section. Whether or not the immediate FSR reevaluation is used, the rates of other BE flows are also likely to change before, during, or after the next RRP reevaluation, as a result of this new flow $F_{new}$ introduction. Thus, in the example of FIG. 6, the rate of flows F4 and F5 are equal or almost equal to the new FSR', of case (b), and that they are even higher than the new FSR" of case (c). Consequently, on the next rate reevaluation period (RRP) reevaluation, F4 and F5 will be categorized as bottlenecked here (BH) flows, as in FIG. 4. Furthermore, on the next occasion when these flows transmit a current rate (CR) or desired rate (DR) field, they will be notified to reduce their rate to the new, lower, fair-share rate (FSR).

FSR Increase after Some Flows have Terminated

Figure 7:
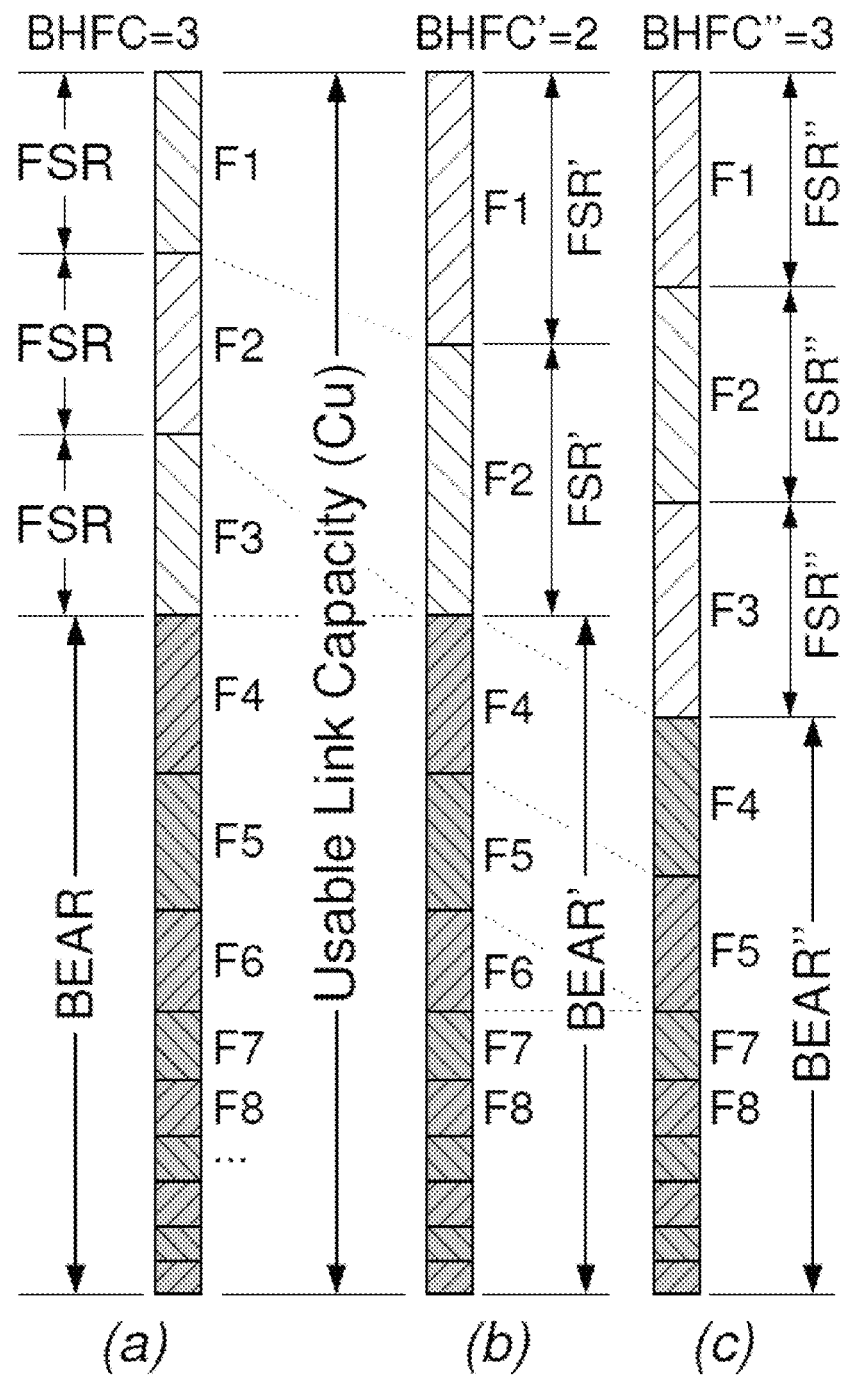
FIG. 7 shows an example of a link according to an implementation of the MMF Regulator, illustrating the effects on the flows within the link when a flow terminates.

Finally, FIG. 7 illustrates the converse case, where a flow that was traversing the link under consideration has terminated, thus releasing the portion of the link capacity that it was occupying. The released capacity is equally divided to the bottlenecked-here (BH) flows, since the BE flows are bottlenecked elsewhere and thus cannot increase their rates, thus the fair-share rate FSR increases. FIG. 7 starts from a previous state, in part (a), that is the same as parts (a) of FIGS. 4, 5, and 6.

In part (b), of FIG. 7, one of the bottlenecked-here (BH) flows, F3, has terminated, thus reducing the count of such flows by one: BHFC'=BHFC–1. The bottlenecked-elsewhere (BE) flows remain the same, thus BEAR'=BEAR; the remaining capacity, $C_u$–BEAR'=$C_u$–BEAR, is now divided among fewer BH flows, BHFC', thus yielding a higher fair-share rate (FSR).

BEAR", although higher than BEAR', when subtracted from usable link capacity $C_u$, but divided by BHFC"=2 rather than BHFC'=3, now yields a higher fair-share rate, FSR", because of the reduced rate of F3.

In part (c) of FIG. 7, instead, the flow that terminated, F6, is a bottlenecked-elsewhere (BE) flow. This reduces the aggregate rate of BE flows by the terminated flow's rate: BEAR"=BEAR–CR$_{F6}$ which increases the capacity that is left available for the bottlenecked-here (BH) flows by the same amount, i.e. by the rate of the terminated flow. Since the count of BH flows stays the same, BHFC"=BHFC, this results in an increase of FSR by the rate of F6 divided by BHFC, as seen in FIG. 7. FIG. 7 has been drawn assuming the rate of the terminated flow is known (hence whether it was a BE or BH flow), and that the new FSR is instantly reevaluated—before the next FRP procedure—as under the optimizations described below.

Overall Flow and Rate Counting Procedure

Previous sections presented the basic idea of why and how the MMF Regulator, in one implementation, counts the flows that pass through each link and their rate during each rate reevaluation period (RRP). The rationale behind this counting, and how the MMF Regulator may adapt to the dynamics of flow and rate evolution was also described. An exemplary implementation of a flow and rate counting procedure will now be explained, as illustrated in FIG. 8.

At each network link that participates in the MMF Regulator, the three (or more) counts, bottlenecked-elsewhere aggregate rate count (BEAR), bottlenecked-elsewhere maximum rate register (BEXR), and bottlenecked-here flows count (BHFC) are accumulated, in three corresponding registers, across all flow-and-rate packets (FRP) that traverse the link during each rate reevaluation period (RRP). The counting procedure for BEAR and BHFC was discussed above; for BEXR, the need to have this one or more counter(s) will be presented in subsequent sections. In one implementation, the three counters are initialized to zero before each RRP starts. The counting procedure uses the fair-share rate (FSR) value that resulted from the previous rate reevaluation period (RR), stored in a fourth register, after a predetermined small margin is subtracted from it in order to form the comparison threshold as described previously.

Figure 8:
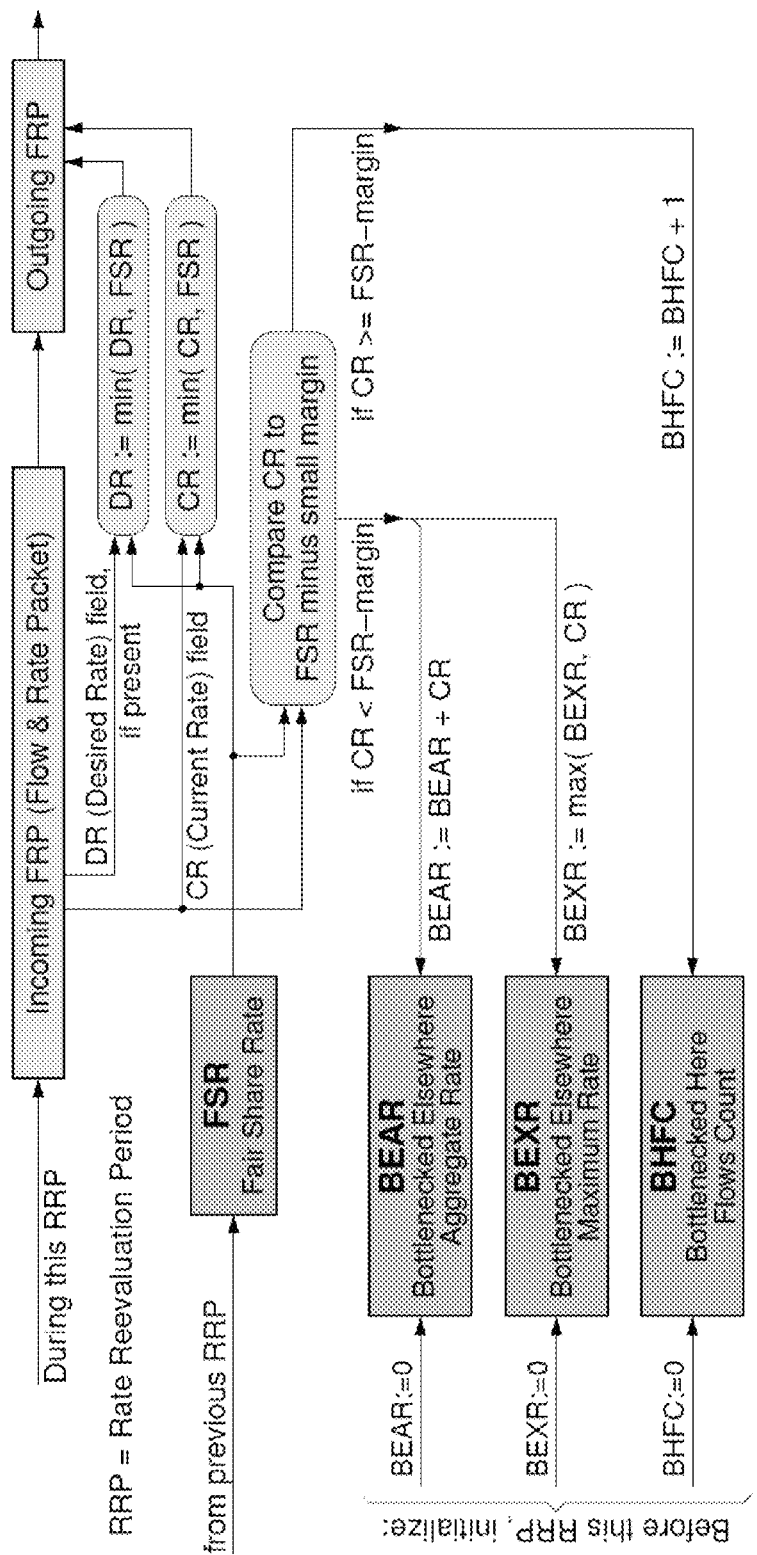
FIG. 8 shows an exemplary flow and rate counting procedure at a link during a rate reevaluation period, according to an implementation of the MMF Regulator.

In one implementation, all FRPs contain a current rate (CR) field, and each FRP may optionally also contain a desired rate (DR) field; as with all packets that contain CR and/or DR fields, the link modifies these fields if they are higher than the link's current fair-share rate (FSR) value so that they are not higher than this FSR value; this is shown at the top of FIG. 8. Additionally, the CR value is compared to the above threshold (FSR minus a predetermined small margin), and, based on the result of this comparison, one or two of the counters are incremented, as follows: for the FRPs whose CR is lower than the comparison threshold (FSR minus a predetermined small margin), the packet's CRs are accumulated (added) into the bottlenecked-elsewhere aggregate rate (BEAR) register/accumulator; in addition, for these same FRPs: the maximum among the CRs of these bottlenecked-elsewhere flows is maintained and updated, in a register called bottlenecked-elsewhere maximum rate (BEXR), for boundary-condition purposes. In another implementation of the MMF Regulator, more than one such registers may be used, recording as many maxima among the rates of the bottlenecked-elsewhere (BE) flows as the number of such registers. For the rest of the flow-and-rate packets (FRPs), the number of such flows is counted, and the count is maintained in the bottlenecked-here flows count (BHFC) register.

Next FSR Calculation

In one implementation of the MMF Regulator, at the end of every rate reevaluation period (RRP), a fair-share rate (FSR) value for the next RRP is calculated, based on the FSR of the current RRP, at every participating link. In one implementation, this next FSR value is calculated in two steps. First, a new FSR value is calculated, using the three counts, BEAR, BEXR, and BHFC, noted above, (which use the current FSR). Second, the "new FSR" and the "previous" (i.e. current) FSR values are combined together, in order to yield the next FSR value; in one implementation, this is done for robustness (noise filtering) purposes, as is often done in adaptive control systems, and as described in further detail below.

New FSR Value in the Normal Case (BHFC>0, BEAR not Near $C_u$)

In one implementation, link operation and flow and rate evolution will be as described in previously, in which cases the new FSR value using two of the three counts (BEAR, BEXR, BHFC) and the usable link capacity $C_u$:

$$FSR_{new}=(C_u-BEAR)/(BHFC)$$

In this exemplary implementation, bottlenecked-elsewhere aggregate rate (BEAR) and bottlenecked-here flow count (BHFC) are the final contents in these registers, after all flow-and-rate packets (FRPs) of this rate reevaluation period RRP have passed by and have been counted, these counts are affected by the "previous" (i.e. current) FSR value. As indicated by the above formula, this can only be applied when BHFC≠0, i.e. BHFC>0, given that this count is always non-negative (it is initialized to zero, and may subsequently be only incremented); the case BHFC=0 is treated in the next subsection. Also, this formula can only be applied when $(C_u-BEAR)>0$, given that only positive fair-share rate (FSR) values make sense; the opposite case is discussed below. Furthermore, $(C_u-BEAR)$ should not only be positive but also sufficiently large so that the new FSR is not out of proportion with the previous FSR. Methods of testing and remedying such a situation will be discussed below.

New FSR when all Flows are Bottlenecked Elsewhere (BHFC=0)

Figure 9:
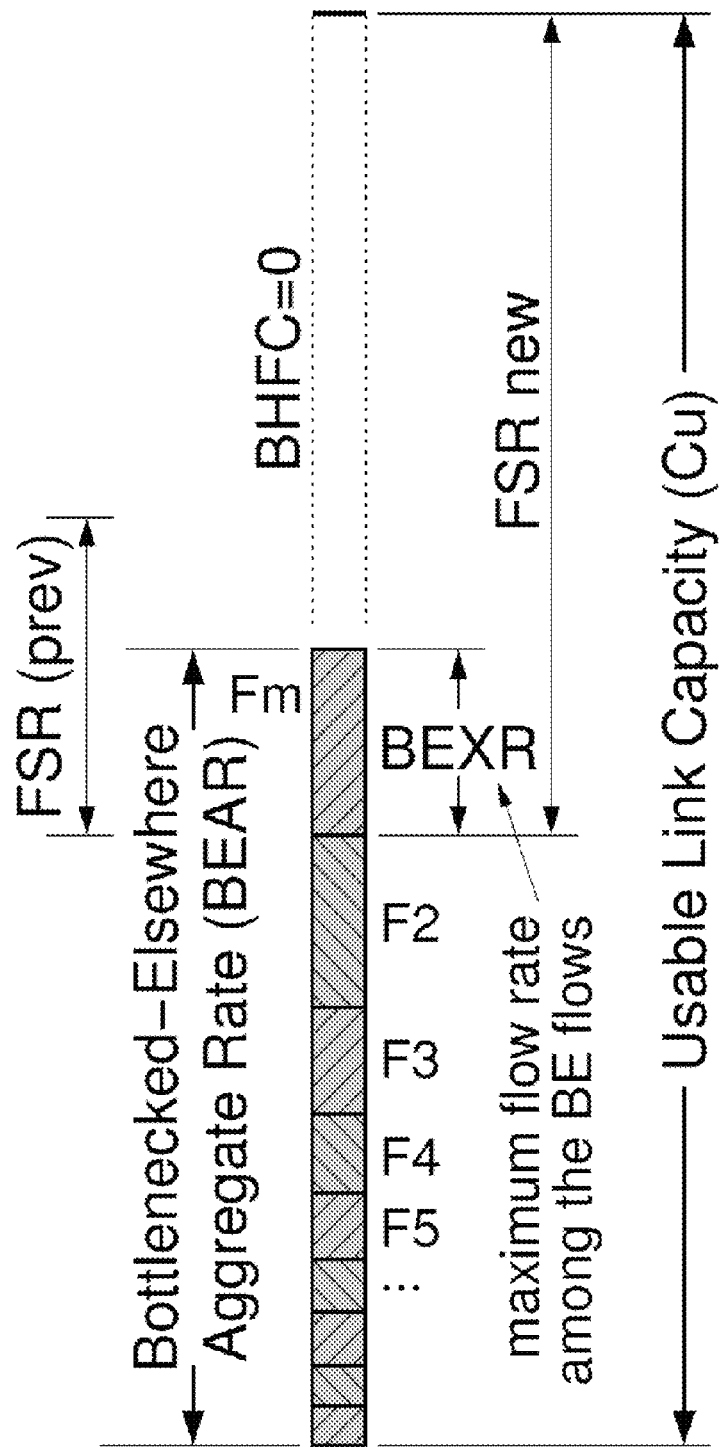
FIG. 9 shows an example of a link according to an implementation of the MMF Regulator, illustrating the effects on the flows within the link when all flows are bottlenecked elsewhere.

FIG. 9 illustrates a situation when bottlenecked-here flow count BHFC=0, i.e. all flows are bottlenecked elsewhere, and bottlenecked-elsewhere aggregate rate (BEAR)<$C_u$, i.e., this is an underutilized link (because the other, bottleneck links restrict all flows to rates lower than the present link could offer them). The new value of the fair-share rate (FSR) should be set to the rate that this link is able to offer to one of its flows if that flow requests a rate increase (via a desired rate (DR) field in a packet). Such a rate increase would be acceptable by a value up to $(C_u-BEAR)$, i.e. the excess capacity that now remains unutilized. This is an increase over the old rate of that flow, so the new allowed flow rate would be (FlowRate$_{old}$+$C_u$-BEAR); the new value of FSR should be set to this rate value, where FlowRate$_{old}$ could be the current rate (CR) of any one of the flows passing through this link.

In one implementation, the ambiguity noted above may be resolved by arbitrarily selecting the largest of the current flows, shown as $F_m$ in the figure—this flow can be described as the most likely flow to request a rate increase. The bottlenecked-elsewhere maximum rate (BEXR) register contains the current rate of that largest (BE) flow. In this way, the new fair-share rate (FSR) value becomes what is pictorially shown in FIG. 9:

$$FSR_{new}=(C_u-BEAR+BEXR)$$

Notice that an alternative way for this same value to result is to modify the three counters as follows, at the end of the RRP: When BHFC=0, pick the largest BE flow, whose rate is BEXR, and fix the counters assuming that this particular flow is bottlenecked here (BH): BEAR:=BEAR−BEXR; BHFC:=BHFC+1, i.e. BHFC=1 now, since it was zero. After this fixing of the counters, BHFC>0, and if we apply the same formula [$FSR_{new}=(C_u-BEAR)/(BHFC)$], the same $FSR_{new}$ as above will result. In another exemplary embodiment of the MMF Regulator where more than one BEXR register is used, the above procedure may be repeated as many times as there are BEXR registers: for each such register, which corresponds to one of the heaviest flows, subtract its content (rate) from BEAR, and add 1 to BHFC; at the end, calculate $FSR_{new}$ as described above.

Also notice that everything above, in this subsection, also applies for an empty link, i.e. a link that has no flows passing through it; in that case, BEAR=0, hence also BEXR=0, and BHFC=0, and by applying these values to either the formula above or to the counter-fixing method just mentioned, the resulting new FSR value is equal to $C_u$, the entire usable link capacity. This is also the value to which the FSR register should be initialized when the link starts operation after a reset, since, at that time, no flows pass through this link.

New FSR Alternative 1, for Growing Traffic: BEAR Approaches $C_u$

This subsection as well as the next one discusses cases that should rarely occur when the MMF Regulator operates in a well-tuned way and under regular traffic circumstances (flow rates vary slowly relative to the RRP). Also, the "Fast Response" optimizations described below, when implemented, will greatly reduce the frequency of occurrence of the abnormal circumstances that are examined in this and the next subsection.

Figure 10:
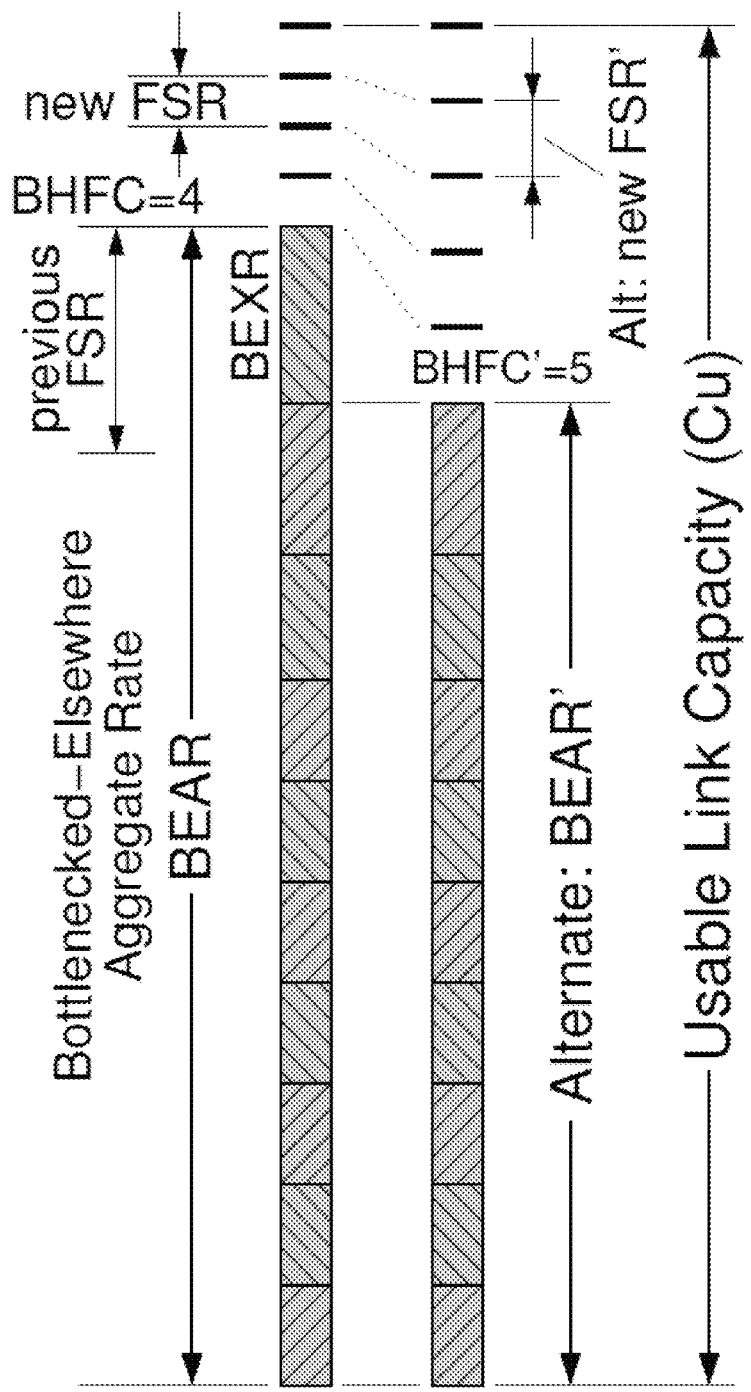
FIG. 10 shows an example of a link according to an implementation of the MMF Regulator, illustrating the effects on the flows within the link when the bottlenecked-elsewhere aggregate rate approaches usable link capacity.

FIG. 10 shows a case where traffic has grown much heavier in this rate reevaluation period (RRP) relative to the previous one; as a result, the fair-share rate (FSR) has decreased, but the network does not know that and compares all flow rates (CR) to the previous FSR (minus a small predetermined margin). As a result, many flows that now become bottlenecked here (BH) are considered as bottlenecked elsewhere (BE) when compared to the previous, larger FSR value. As an illustration of this, FIG. 10 shows almost the same number of flows as FIG. 4, but the flows that were lighter have grown heavier (massively and in the same RRP, contrary to the slow-change assumption), approaching the comparison threshold (previous FSR minus margin)— but not surpassing it. Because many bottlenecked-here (BH) flows are thought to be bottlenecked-elsewhere (BE), their rates are added into BEAR, and, consequently, BEAR grows excessively and approaches $C_u$—if these flows were correctly categorized as BH flows, the system would simply count their number and equally divide the available capacity among them; by erroneously categorizing them as BE, the system accepts their current rate as-is, and then almost nothing remains for the rest of the flows. Other possible reasons for this much heavier load situation can be the opening of several new flows since the previous RRP; in this case, however, if the "Fast Response" optimizations described below in an implementation of the MMF Regulator are used, then the fair-share rate (FSR) will be properly adjusted (reduced) every time a new flow opens, and this will have completed before the new FSR calculation.

Under the above circumstances, the BEAR count may grow so high as to approach $C_u$ or even surpass it. When BEAR approaches $C_u$, the new fair-share rate (FSR) value that the formula above calculates is too pessimistic (too low), as exemplified in FIG. 10; the real FSR will be larger than that, because some of the flows that were considered as bottlenecked elsewhere (BE) are actually bottlenecked here (BH).

In one implementation, the MMF Regulator can make a correction to account for this problem by changing the largest of the bottlenecked-elsewhere (BE) flows, the one with rate=BEXR, as actually being a bottlenecked-here (BH) flow, in other words, precisely as in the previous subsection: BEAR:=BEAR−BEXR; BHFC:=BHFC+1, as illustrated in FIG. 10. Again, in another exemplary embodiment of the MMF Regulator, where more than one BEXR register is used, the above procedure will be repeated as many times as there are BEXR registers: for each such register, which corresponds to one of the heaviest flows, the MMF Regulator will subtract its content (rate) from BEAR, and add 1 to BHFC. At the end, the MMF Regulator may calculate $FSR_{new}$ as described above. The next subsection gives another alternative for a correction that can be made, and then section 3.3.5, gives a possible criterion for which of the alternative $FSR_{new}$ values to keep.

New FSR Alternative 2, for Growing Traffic: BEAR Exceeds $C_u$

Figure 11:
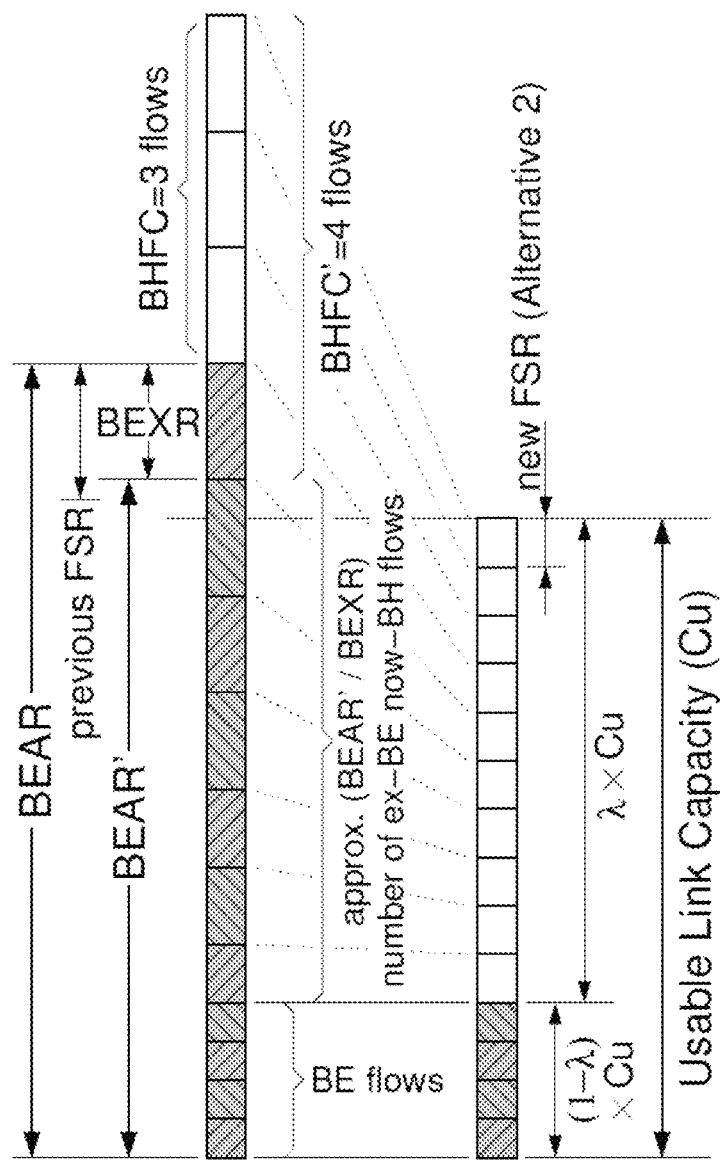
FIG. 11 shows an exemplary method of calculating the fair-share rate, according to an implementation of the MMF Regulator.

In another exemplary embodiment, when traffic in the current rate reevaluation period (RRP), relative to the previous RRP, has grown even heavier than what was considered above, even the correction considered there will not be applicable: if the new BEAR count exceeds the usable link capacity, G (more precisely, if BEAR−BEXR exceeds $C_u$), then neither the original new fair-share rate (FSR) calculation of section nor the alternative described above can be applied because the numerator, ($C_u$−BEAR), would be negative. FIG. 11 illustrates this situation, and shows another heuristic, alternative 2, that can be used in this case to calculate a new FSR value. In one implementation, this is an approximate calculation, so as to be simple to implement; and the MMF Regulator itself may be approximate and iterative, converging after a few RRP iterations (if the traffic does not change in the meantime).

Thus, when BEAR exceeds $C_u$, first the MMF Regulator may apply the corrections of the previous two subsections, namely moving the heaviest bottlenecked-elsewhere (BE) flow into the bottlenecked-here (BH) category: BEAR':=BEAR−BEXR; BHFC':=BHFC+1, as shown in FIG. 11. If more than one BEXR register is used, then all corresponding flows are similarly moved to the BH category. The rest of the procedure, below, works with the finally resulting BEAR' and BHFC' values, and with the BEXR value of the last one of these registers.

Because traffic has grown much heavier, a significant but unknown number of the heavier ex-BE flows have now become BH, and their rate should be reduced to the new FSR value that the MMF Regulator is trying to estimate. Given the very limited knowledge available about flow rates, the MMF Regulator may revert to the following very approximate simplifications. First, it assumes that, in the new situation, a percentage $\lambda$ of $C_u$ will be occupied by bottlenecked-here (BH) flows, while the remaining $(1-\lambda) \times C_u$ portion of the link capacity will be occupied by relatively small, BE flows. The MMF Regulator does not know $\lambda$, but it may set $\lambda$ to a fixed, preconfigured value, which is a tuning parameter of the MMF Regulator. In one implementation, an initial value for $\lambda$ may be in the range of 60 to 80 percent, with the rationale that on a heavily loaded link the majority of the throughput is used by flows for which this specific link is their bottleneck, i.e. they are bottlenecked here (BH); the specific value for initial starting point does not have to be precise, since successive rate reevaluation period (RRP) iterations will converge to the real value.

In one implementation, the MMF Regulator may next try to estimate the number of flows that were considered as BE but turn out to be BH. These are the heavier among the ex-BE flows, shown in the middle, in FIG. 11; they are the flows whose rate is higher than the new FSR, but of course the MMF Regulator knows neither the new FSR nor has it registered the rates of individual flows. In one implementation, the MMF Regulator may approximate this number as (BEAR'/BEXR), based on the following argument: if all of the flows had rate BEXR, each, and if their aggregate rate were BEAR', then this would be their number. In reality, the rate of each of them is ≤BEXR, since BEXR is the maximum among the ex-BE flow rates, and their aggregate rate is also BEAR', since the "lower" $(1-\lambda) \times C_u$ portion of BEAR' is not in this flow category. Because both the real numerator and the real denominator are smaller than those used by the MMF Regulator their error effects will partially compensate for each other. Based on this heuristic, the MMF Regulator has now determined, as illustrated in FIG. 11: (a) the number of ex-BE but now-BH flows is estimated as (BEAR'/BEXR); (b) the number of BH flows (that both were BH and are still BH) was counted to be BHFC'. The total of BHFC'+(BEAR'/BEXR) flows must now equally share the portion $\lambda \times C_u$ of the link capacity, and this equal share will be the new FSR estimate:

$$FSR_{new} = \lambda \times Cu/[BHFC'+(BEAR'/BEXR)]$$

Overall New FSR Calculation

In one exemplary embodiment, the MMF Regulator can put all of the above cases together into an overall procedure to be followed for calculating a new fair-share rate (FSR) value: for each participating link, at the end of each rate reevaluation period (RRP), the MMF Regulator may calculate the following in succession, when each of them is defined:

$$FSR_{new,0} = (C_u - BEAR)/(BHFC) \qquad (1)$$

This is the "basic" case, called case 0, and it is defined when BEAR<$C_u$ and BHFC>0.

$$FSR_{new,1} = (C_u - BEAR')/(BHFC'), \qquad (2)$$

where: BEAR'=BEAR−BEXR; and BHFC'=BHFC+1.
This is alternative 1, and it is defined when BEAR'<$C_u$ (BHFC' is always >0, by its definition).
When both $FSR_{new,0}$ and $FSR_{new,1}$ are defined, select and keep the maximum of the two; else, when only $FSR_{new,1}$ is defined, then keep this value.
If multiple BEXR registers exit, go successively through them, and for each of them subtract its value from the previous resulted BEAR', add 1 to the previous resulted BHFC', calculate the above formula, and compare its result to the previous resulted $FSR_{new,1}$. If the new result is larger than the previous, keep the new result and continue with the next BEXR register; if the new result is not larger than the previous, then keep the previous and stop the procedure.

$$FSR_{new,2} = \lambda \times Cu/[BHFC'+(BEAR'/BEXR)], \qquad (3)$$

where: $\lambda$ is the tuning parameter described above; BEAR'=BEAR−BEXR; and BHFC'=BHFC+1, or their values for multiple BEXR registers that resulted as described above.
This is alternative 2, and it is defined when BEXR>0.
When BEXR=0 and thus $FSR_{new,2}$ is undefined, then $FSR_{new,1}$ is always defined, because BEXR=0 implies BEAR=BEAR'=0, and hence $FSR_{new,1}$ is defined; in this case, keep the result of the previous step, "alternative 1", and the algorithm is finished.
Else, when $FSR_{new,2}$ is defined but $FSR_{new,1}$ was undefined, then keep $FSR_{new,2}$ and the algorithm terminates.
Else, i.e. when both $FSR_{new,1}$ and $FSR_{new,2}$ are defined, then select between the two (where $FSR_{new,1}$ is the result selected at the end of the "alternative 1" step) as follows: if both of them are lower than the FSR value of the previous RRP, then select the larger of the two; else select the result of the "alternative 1" step, $FSR_{new,1}$.

The rationale for the selection during the "alternative 1" step is that: as long as moving flows from BE to BH increases FSR, the rate of the moved flow was higher than the previous version of $FSR_{new,1}$ and hence it was correct to move this flow into the BH category. The rationale for the selection at the "alternative 2" step is the following: alternative 1, when defined, is in general an accurate and reliable estimate, hence preferable, except when it is much smaller that the previous FSR; alternative 2 is more reliable when it is small, and it can be totally mistaken when it is large; thus, when both are relatively small—smaller than the previous FSR—then the larger of the two will tend to be better, otherwise the result of the alternative 1 step will be the more reliable one.

Merging the New and the Previous FSR's into the Next FSR

In one implementation, each rate reevaluation period (RRP) starts with a ("current" or "previous") FSR value, that it inherits from the previous RRP. During the RRP, a "new" FSR value is calculated, as described above. At the end of the RRP, the MMF Regulator produces a "next" FSR value, to be "given" to the next RRP.

The next FSR value, to be given to the next RRP, could be the same as the $FSR_{new}$ value that was calculated above. However, because $FSR_{new}$ is only an approximate estimate, hence may contain errors, for robustness purposes, the MMF Regulator may determine the next FSR to be a weighted average of the current (previous) FSR and $FSR_{new}$:

$$FSR_{next} = \alpha \times FSR_{new} + (1-\alpha) \times FSR_{previous}$$

where 0<$\alpha$≤1 is the "innovation" weight factor: when $\alpha$=1, then the new FSR is immediately and fully adopted, i.e. the MMF Regulator innovates completely during each and every RRP; when a has smaller values, the newly calculated FSR value has a correspondingly smaller influence, while the MMF Regulator maintains a correspondingly larger part of the past history. Such an averaging method is often used in adaptive control systems in order to filter out noise (error) components, while slowly and smoothly adapting to the evolution of the environment, assuming that the latter evolution is slow relative to the reevaluation frequency—RRP in this case.

In one implementation, the innovation weight factor $\alpha$ is a tuning parameter of the MMF Regulator. In networks where fast response to quickly-changing traffic conditions is desired, $\alpha$ should be large, even equal to 1 (100%), i.e. immediately adopt $FSR_{new}$. On the other hand, when RRP is short relative to the timeframe of flow changes, then intermediate values (e.g. 50%) will provide the MMF Regulator with an increased robustness and smoothness.

Multiple RRP Optimization

The rate reevaluation period (RRP) value is a tradeoff between speed of response, for short RRP values, and low overhead, for high RRP values. Some networks may carry both heavy, short-lived flows, for which a short RRP is appropriate, and light, long-lived flows, for which a long RRP is preferable. In such cases, the MMF Regulator can operate with two or more different RRPs.

Figure 12:
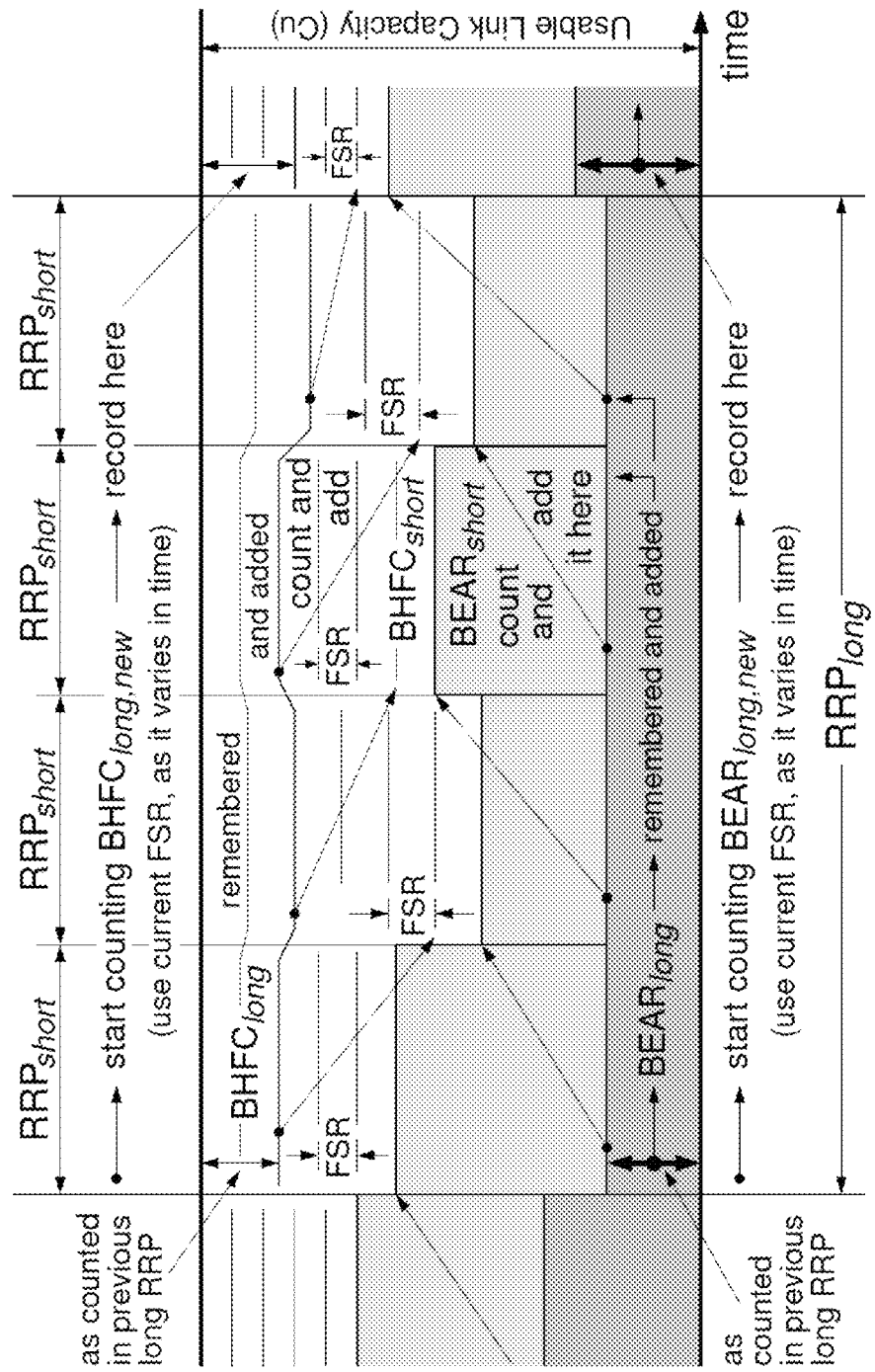
FIG. 12 shows exemplary operation of the MMF Regulator with a long and a short rate reevaluation period.

FIG. 12 shows an exemplary embodiment of MMF Regulator operation with two different RRPs, $RRP_{long}$ and $RRP_{short}$ where the long RRP is an integer multiple of the short RRP. By analogy, the MMF Regulator can also operate with three or more RRPs. In one implementation, each flow belongs to one and only one RRP, and the flow-and-rate packets (FRPs) for each flow contain a flag specifying which RRP the flow belongs to.

In one implementation, the flows and their rates for each different class of flows (per RRP class) must be counted separately, because they are counted over different time intervals (different RRPs). Thus, the BEAR, BEXR, and BHFC must be repeated per-RRP. Note that the fair-share rate (FSR) register, however, is a single one for the entire link, since the fair-share rate is a single rate for all flows on the link.

In addition, in one implementation, for all but the shortest RRP, the MMF Regulator needs one additional register per counter, where the register remembers, throughout each RRP, the final value that its counter reached during its previous RRP; this is needed because the value of the counter is not valid or useful before the end of each RRP, since, at intermediate RRP times, some of the flows have been added to the counter while others have not yet been added. FIG. 12 shows an exemplary embodiment of operation of the MMF Regulator with two RRPs, which is as follows:

At the beginning of each long RRP, copy the final values of the three long-RRP counters into the corresponding registers: $BEAR_{long,reg}:=BEAR_{long,cnt}$; $BEXR_{long,reg}:=BEXR_{long,cnt}$; $BHFC_{long,reg}:=BHFC_{long,cnt}$ and then initialize these three counters to zero: $BEAR_{long,cnt}:=0$; $BEXR_{long,cnt}:=0$; $BHFC_{long,cnt}:=0$.

During the long RRP: count all FRPs that belong to the long RRP in the corresponding counters ($BEAR_{long,cnt}$; $BEXR_{long,cnt}$; $BHFC_{long,cnt}$).

During each short RRP, which occurs somewhere during the duration of a long RRP, use the contents of the long-RRP registers ($BEAR_{long,reg}$; $BEXR_{long,reg}$; $BHFC_{long,reg}$), since the corresponding long-RRP counters contain not-yet-final, thus invalid values.

During each short RRP, use the three short-RRP counters ($BEAR_{short,cnt}$; $BEXR_{short,cnt}$; $BHFC_{short,cnt}$): first initialize them to zero, and then use them for counting all FRP's that belong to the short RRP.

At the end of each short RRP, calculate the total BEAR, BEXR, and BHFC values—to be subsequently used to find the next FSR—as follows: $BEAR=BEAR_{long,reg}+BEAR_{short,cnt}$; $BEXR=\max\{BEXR_{long,reg}; BEXR_{short,cnt}\}$; $BHFC=BHFC_{long,reg}+BHFC_{short,cnt}$ At the end of each short RRP, use the total BEAR, BEXR, and BHFC values as defined above for calculating the next FSR as was described above.

The FSR value just calculated is valid during the next short RRP, i.e. until another "next FSR" is calculated, and it is used for all the purposes of the MMF Regulator where FSR is needed, i.e.: (i) to compare against the CR and DR fields of any packet; and (ii) to define the comparison threshold used in the flow and rate counting, for all FRPs, of both short- and long-RRP.

The essential idea in the above counting is that BEAR and BHFC are the corresponding sums for all flows, hence the sums for both the long-RRP and short-RRP flows. However, these counts for the long-RRP cannot be used directly, because, most of the time, the system is still in the middle of the long RRP, hence long-RRP flow counting is still in progress. For this reason, the MMF Regulator remembers the values of these counts, for the long-RRP flows, since the last time when their counting completed, i.e. since the end of the most recent long RRP.

Fast Response Optimizations

A good rate regulation and congestion management mechanism should respond quickly and accurately to sudden traffic pattern changes, and this is one of the hardest tasks for such mechanisms. For the MMF Regulator, the most sudden "hard" traffic changes are the opening of new flows, given that, for ongoing flows, rate increases are only allowed after the MMF Regulator has given its permission ("easy" traffic changes, on the other hand, are reduction of rate of ongoing flows or the closing (completion) of existing flows: these can only yield underutilization of network resources, not congestion). The performance of the MMF Regulator can be greatly improved in this respect, if the following improvements are included in its operation. Their basic idea is that every new flow notifies the network, when it opens, through a variant of a flow-and-rate packet (FRP), and similarly when a flow has completed and is about to close it also notifies the network with another variant of an FRP.

Besides these two optimizations, for opening and for closing flows, a third, independent but related optimization may be implemented: short-circuit rate feedback, as described in previous sections. This short-circuit rate feedback will be particularly effective when combined with the opening flow optimization described below.

Opening Flow Notification FRP and Response to it

Under this option, sources may transmit an opening flow and rate packet (open-FRP) at or near the beginning of some or all of the flows that they originate. In one implementation of the MMF Regulator, especially heavy and long-lived flows may use open-FRPs, while short-lived or light flows may choose not to use one; and, of course, single-packet transmissions that do not belong a longer flow are expected not to be engaged by the MMF Regulator, and hence not to use any of these mechanisms.

The open-FRP may (advantageously) be the first packet of the new flow, or it may be another packet near the beginning of the flow, and, when present, it should replace the normal FRP for this flow during the first, "current" RRP when this flow happened to open. In other words, the source should not transmit another, normal FRP during the first RRP of this flow—but it should transmit normal FRPs during all subsequent RR's of the flow's lifetime.

The open-FRP is similar to a normal FRP described previously, the only difference being the presence of a flag in the header that identifies this packet as being the opening-flow variant of the FRP; other than this identification, all other fields and options in the packet header are the same as in normal FRPs. In one implementation, network switches and links that participate in the MMF Regulator process these open-FRPs as follows:

When a network uses the open-FRP option, it needs one additional register per counter, for the three basic counters, BEAR, BEXR, and BHFC. This is similar to the case for the long-RRP described previously, but here it is needed for the single set of counters in the single-RRP case, or for the short-RRP counters as well in the multiple-RRP case. As in the long-RRP case, the registers remember, throughout each RRP, the final value that the corresponding counter reached during the previous RRP. This is needed because we will be doing corrections with the registered values, and FSR reevaluations, during the RRP, while the values in the counters are not valid or useful before the end of each RRP, since, at intermediate RRP times, some of the flows have been added to the counters while others have not yet been added.

At the beginning of each RRP, copy the final values of the three counters into the corresponding registers: $BEAR_{reg}:=BEAR_{cnt}$; $BEXR_{reg}:=BEXR_{cnt}$; $BHFC_{reg}:=BHFC_{cnt}$ and then initialize the three counters to zero, as in FIG. 8: $BEAR_{cnt}:=0$; $BEXR_{cnt}:=0$; $BHFC_{cnt}:=0$. If multiple RRPs are used, then this discussion applies to the shortest of the RRPs.

During the RRP: count all FRPs, including the open-FRPs, using the three counters ($BEAR_{cnt}$; $BEXR_{cnt}$; $BHFC_{cnt}$). If multiple RRPs are used, each open-FRP is counted in the counters that correspond to its selected RRP.

In addition to counting as above using the counters, open-FRPs also modify the three registers, and also trigger a recalculation of the current FSR, as presented below. This corresponds to the fact that the three registers and the FSR represent the "most recently known" state of the traffic; since a new flow is now starting, this new flow should be added to BEAR, BEXR, and BHFC, just like all other flows that have already been recorded there, and should participate in calculating the FSR under the new circumstances. Thus, the operations to be performed for each open-FRP are as in the following two items: (1) if the CR of the open-FRP is lower than the comparison threshold, then $BEAR_{reg}:=BEAR_{reg}+CR$ and $BEXR_{reg}:=max(BEXR_{reg}; CR)$. Else, when the CR of the open-FRP is not less than the comparison threshold, then $BHFC_{reg}:=BHFC_{reg}+1$; if multiple RRPs are used, then open-FRPs update the registers (not the counters) of the RRP that the open-FRP belongs to. (2) The current FSR is a function of BEAR, BEXR, and BHFC. Now that these have been updated as above, use the new $BEAR_{reg}$, $BEXR_{reg}$, and $BHFC_{reg}$ values for recalculating the current FSR, according to the procedure described previously. If multiple RRPs are used, then the recalculation of the FSR here is done using the total BEAR, BEXR, and BHFC register contents, for all RRPs.

As discussed above, the short-circuit rate feedback optimization is related to and independent of this optimization: when the MMF Regulator uses both optimizations, an open-FRP whose CR field is much higher than the FSR of this link (either before or after its above recalculation) will trigger the immediate generation of a new rate (NR) feedback packet to the source of the flow, in addition to all the above register updates and FSR recalculation.

Closing Flow Notification FRP and Response to it

Under this option, sources may transmit a closing flow and rate packet (close-FRP) at or near the end (completion) of some or all of the flows that they originate. In one implementation, especially heavy and long-lived flows may use close-FRPs, just like open-FRPs above, while short-lived or light flows may choose not to use one.

Depending on how early a source is able to foresee the completion of a flow (e.g., if the size and the rate of a data transfer are known, then the completion time is also known), in one implementation, the source should try to do the following: (i) The source should not send a (normal) FRP for this flow during the last RRP of this flow—the reason is that FPRs concern "rate reservations" for the next RRP, and since this flow knows that it will not exist during the next RRP, it should not reserve corresponding rate; and (ii) The source may send a close-FRP in the last packet or in a slightly earlier packet of the closing flow ("slightly" earlier is relative to the time-scale of rate-feedback in the network). Sending a close-FRP is more useful when the flow completes early within the RRP where it completes, so that it releases its rate allocation for the rest of this RRP—releasing its rate for the next RRP will happen anyway owing to the source not having sent a (normal) FRP during its last RRP.

The close-FRP is similar to a normal FRP, the only difference being the presence of a flag in the header that identifies this packet as being the closing-flow variant of the FRP; other than this identification, all other fields and options in the packet header are the same as in normal FRPs. Network switches and links that participate in the MMF Regulator implementation may process these close-FRPs as follows:

When a network uses the close-FRP option, it will need one additional register per counter, for the three basic counters, BEAR, BEXR, and BHFC, same as when the network uses the open-FRP option above. Normally, when using the close-FRP option, the open-FRP option will also be used, in which case this need for additional registers will have already been satisfied.

In one implementation, at the beginning of each RRP, the MMF Regulator copies the values of the three counters into the registers: $BEAR_{reg}:=BEAR_{cnt}$; $BEXR_{reg}:=BEXR_{cnt}$; $BHFC_{reg}:=BHFC_{cnt}$ and then initializes the three counters to zero. If multiple RRPs are used, then this discussion applies to the shortest of the RRPs.

During the RRP: the MMF Regulator then counts all normal FRP's using the three counters ($BEAR_{cnt}$; $BEXR_{cnt}$; $BHFC_{cnt}$), as was described previously.

In one implementation, Close-FRPs modify the registers, and also trigger a recalculation of the current FSR, as presented below. This corresponds to the fact that the three registers and the FSR represent the "most recently known" state of the traffic; since a flow is now closing, its rate is released and should thus be subtracted from $BEAR_{reg}$ or $BHFC_{reg}$, hence FSR will increase. Note that $BEXR_{reg}$ cannot be recomputed, because the MMF Regulator does not know the "next-to-maximum" BE flow. Thus, the operations to be performed for each close-FRP are as in the following two items: (1) if the CR of the close-FRP is lower than the comparison threshold, then: $BEAR_{reg}:=BEAR_{reg}-CR$; else: $BHFC_{reg}:=BHFC_{reg}-1$; if multiple RRPs are used, then close-FRPs update the registers (not the counters) of the RRP that the close-FRP belongs to; (2) The current FSR is a function of BEAR, BEXR, and BHFC. Now that $BEAR_{reg}$ or $BHFC_{reg}$ have been updated as above, use their new value, and $BEXR_{reg}$ as it was, for recalculating the current FSR, according to the procedure described previously. If multiple RRPs are used, then the recalculation of the FSR here is done using the total BEAR, BEXR, and BHFC register contents, for all RRPs.

Weighted Max-Min Fairness (WMMF)

Plain max-min fairness is based on equality among the flows: on its bottleneck link(s), each flow receives as much throughput rate as any other flow that is also bottlenecked on that link, and more than the flows that are bottlenecked elsewhere and hence cannot take advantage of such "equal treatment" on this link. Although "equality" is an intuitively nice and fair notion, there are still cases where not all flows are "born equal" among themselves. For example, some flows may carry very important or very urgent traffic, while others may carry traffic intended to fill up any leftover excess link capacity; or else, some flows may be on behalf of a customer that pays more in order to get premium service; or else, what appears as a single flow over a portion of a larger network may in fact be an aggregation of multiple smaller flows over a portion of their path that is common for all of them. In all such cases, the MMF Regulator may implement weighted max-min fairness (WMMF), in order to reflect the differences among flows, and the relative importance or weight of each flow when compared to the others.

In one implementation of WMMF, each flow i is associated with a weight factor $w_i$ and throughput is allocated to flows in proportion to the weight factor of each: on a link that is a bottleneck for both flows i and j, weighted equality means that flow i will receive a throughput rate $r_i$ and flow j will receive a throughput rate $r_j$ where: $(r_i/w_i)=(r_j/w_j)$, in other words, a flow that has a weight w will receive w times more service than the basic portion—the fair share of service—that is received by a basic flow that has a weight factor of unity, $w_{basic}=1$.

The MMF Regulator may be configured to implement WMMF rate allocation by including the weight factor w of each flow in the header of all packets of the flow that contain a current rate (CR) or a desired rate (DR) field; note that this automatically includes all flow-and-rate packets (FRPs).

The weight factor, w, field in a packet header will be interpreted to mean: this flow is worth w basic flows. For simplicity of implementation, w may be an integer number ≥1; however everything written below applies equally well to non-integer values of w as well (and, either greater or lower than 1, also). The procedure for implementing WMMF, below, can be understood by considering that a flow with weight factor w is as if it contains (includes) a number w of subflows or basic flows, where basic flows are all treated equally among themselves, that is the network applies max-min fairness among basic flows.

In this picture of composite flows of weight factor w that consist of a number w of basic (sub)flows (of weight factor 1, each), in one implementation, the MMF Regulator will interpret the CR field in a packet header of the (composite) flow as referring to the current rate of the entire (composite, real) flow, as opposed to the virtual current rate of each virtual constituent basic flow inside the (real, composite) flow. Similarly, the DR field will refer to the entire flow—not to each of its basic subflows.

On the other hand, in one implementation, the Fair Share Rate (FSR) of each link will refer to the rate that each basic flow is entitled to receive on that link (unless bottlenecked elsewhere). Therefore, a flow of weight factor w will be entitled to receive a rate of w×FSR (unless bottlenecked elsewhere). With these definitions in mind, the MMF Regulator, in one embodiment, may implement WMMF when its basic operation, as described in the previous sections, is modified as follows:

In all cases of comparing the CR and/or DR field in a packet header against the FSR value of a link for purposes of minimum-FSR finding and rate feedback, the comparison shall be between the CR and/or DR value, on one hand, and the product w×FSR on the other hand, where w is this flow's weight factor as declared in this packet's header. When the CR and/or DR field is modified in order for it not to exceed the fair share limit, it shall be modified so that it does not exceed the w×FSR limit.

During flow and rate counting, when comparing the CR field in the FRP against the threshold, which was defined as Threshold=FSR minus small margin, the comparison shall be between the CR value and w×Threshold, where w is this flow's weight factor as declared in this FRP. As a result of this comparison, if CR<w×Threshold then there is no modification in the first action: BEAR:=BEAR+CR. However, for the maximum rate of BE flows, BEXR, since this will later be interpreted as an alternative FSR value, it has to be formulated in units of basic flow maximum rate, hence the action must be modified as follows:

BEXR:=max{BEXR,(CR/$w$)}

Else, when CR≥w×Threshold, the corresponding action is modified as follows:

BHFC:=BHFC+$w$ in other words, when this is a BH flow (bottlenecked here), and since it is equivalent to w basic flows, the MMF Regulator increments BHFC, which is a counter in units of basic flows, by this weight factor w.

Next FSR calculation remains unmodified.

For the multiple-RRP optimization, flow and rate counting per RRP is modified in the same way as for the single-RRP case, as described above.

For the fast response optimizations when the opening or closing flow has a weight factor w, the BEAR, BEXR, and BHFC registers are updated in a way completely analogous to how the corresponding counters were updated, as described above.

To address various issues related to, and improve upon, previous work, the application is directed to DYNAMIC MAX-MIN FAIR RATE REGULATION APPARATUSES, METHODS, AND SYSTEMS. The entirety of this application shows by way of illustration various embodiments. The advantages and features disclosed are representative; they are not exhaustive or exclusive. They are presented only to assist in understanding and teaching the claimed principles. It should be understood that they are not representative of all claimed inventions. As such, certain aspects of the invention have not been discussed herein. That alternate embodiments may not have been presented for a specific portion of the invention or that further undescribed alternate embodiments may be available for a portion of the invention is not a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the invention.

As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, including continuations, continuations-in-part, divisions, and any other application. As such, it should be understood that advantages, embodiments, examples, functionality, features, logical aspects, organizational aspects, structural aspects, topological aspects, and other aspects of the disclosure are not to be considered limitations on the disclosure as defined by the claims or limitations on equivalents to the claims.

The invention claimed is:

1. A processor-implemented method for regulating the flow rate of data packets in a network, the method comprising:

defining a global constant representing a regularly repeating time period common among a plurality of flow sources in the network;

transmitting current flow rate information from each of the plurality of flow sources, and for each flow, to a plurality of links traversed by each flow, exactly once during a current instance of the regularly repeating period;

categorizing each of a plurality of flows passing through the plurality of links on the network into a category for the current instance of the regularly repeating time period for each link by comparing the current flow rate information to a previously determined fair-share flow rate for the link, wherein the categorizing comprises:

categorizing, by each link of the plurality of links, each received flow into a first category or a second category, the first category indicating flows that are bottlenecked at the link and the second category indicating flows that are bottlenecked elsewhere;

determining, by each link of the plurality of links, a count corresponding to a number of received flows categorized into the first category during a current instance of the regularly repeating time period;

determining, by each link of the plurality of links, an aggregate rate representative of a sum of the current rates for received flows categorized into the second category during the current instance of the regularly repeating time period;

determining, by each link of the plurality of links, whether the aggregate rate for the current instance of the regularly repeating time period is less than a usable link capacity; and storing, by each link of the plurality of links, the count in a first register and the aggregate rate in a second register;

determining, by each link of the plurality of links, a new fair-share flow rate for the current instance of the regularly repeating time period in each link based on the count and the aggregate rate; and providing control instructions to each of the plurality of flow sources to regulate the rate of each flow based on fair-share flow rates calculated for each link of the plurality of links, wherein the control instructions provided to each particular flow source instruct the particular flow source to either decrease or increase its flow rate.

2. The method of claim 1, further comprising calculating a next fair-share flow rate value for a next instance of the regularly repeating time period based on the new fair-share flow rate.

3. The method of claim 2, wherein calculating the next fair-share flow rate is also based on a fair-share flow rate calculated previous to the new fair-share flow rate.

4. The method of claim 1, further comprising determining a maximum flow rate of all flows determined to be bottlenecked elsewhere and storing the maximum flow rate of bottlenecked elsewhere flows in a third register.

5. The method of claim 1, wherein determining the new fair-share flow rate based on the count and the aggregate rate for each link comprises applying the following formula: $FSR=(C_u-BEAR)/(BHFC)$, where FSR is the new fair-share flow rate for the link, $C_u$ is the usable link capacity, BEAR is the aggregate rate of the link, and BHFC is the count of the link.

6. The method of claim 1, wherein the current flow rate information is sent from each of the plurality of flow sources as a flow-and-rate packet containing a current-rate field and wherein categorizing each of a plurality of flows comprises comparing a value in the current-rate field with a predetermined threshold.

7. The method of claim 6, wherein categorizing each of a plurality of flows further comprises categorizing the flow as bottlenecked elsewhere when the value in the current-rate field is less than the predetermined threshold, and categorizing the flow as bottlenecked at the link when the value in the current-rate field is greater than the predetermined threshold.

8. The method of claim 7, wherein the predetermined threshold is calculated by subtracting a predetermined tuning parameter from a previously determined fair-share flow rate for each link.

9. The method of claim 1, wherein determining the new fair-share flow rate for the current instance of the regularly repeating time period in each link further comprises incorporating a weighting factor received from one or more flow sources such that flow rates are not distributed equally.

10. The method of claim 1, wherein the regularly repeating time period is synchronized for the plurality of flow sources.

11. A processor-implemented method for regulating the flow rate of data packets in a network, the method comprising:

defining a plurality of regularly repeating time periods, common among a plurality of flow sources in the network, with each flow source selecting exactly one of the plurality of regularly repeating time periods;

transmitting identifying information from each of the plurality of flow sources, and for each flow, to a plurality of links traversed by each flow, wherein each flow source transmits the identifying information exactly once during each instance of a selected regularly and periodically repeating period selected by each of the plurality of flow source;

categorizing each of a plurality of flows passing through the plurality of links on the network into a category for a current instance of the regularly repeating period selected by a corresponding flow source, for each link traversed by the flow, wherein the categorizing comprises:

categorizing, by each link of the plurality of links, each received flow into a first category or a second category, wherein the first category is associated with flows that are bottlenecked at the link and the second category is associated with flows that are bottlenecked elsewhere;

counting, by each link of the plurality of links, a number of received flows categorized into the first category for each current instance of the plurality of regularly repeating periods;

determining, by each link of the plurality of links, an aggregate rate representative of a sum of the current rates for received flows categorized into the second category during each current instance of the plurality of regularly repeating periods;

determining, by each link of the plurality of links, whether the aggregate rate is less than a usable link capacity;

storing, by each link of the plurality of links, results of the counting in a first register and the aggregate rate in a second register;

determining, by each link of the plurality of links, a new fair-share flow rate for a current instance of a shortest regularly repeating period based on the results of the counting and the aggregate rate for the current instance of the shortest regularly repeating period and other recently completed longer periods; and providing control instructions to each of the plurality of flow sources to regulate the rate of each flow based on fair-share flow rates calculated for each link of the plurality of links, wherein the control instructions provided to each particular flow source instruct the particular flow source to either decrease or increase its flow rate.

12. A system for regulating a flow of data packets in a network, the system comprising:
   an interconnection network comprising a plurality of network devices connected by a plurality of links configured to carry data-packet flows;
   a plurality of nodes in communication with the interconnection network, wherein each node of the plurality of nodes is configured to act as a source for one or more of the data-packet flows;
   a rate reevaluation period estimator configured to determine a global time constant representing a regularly repeating time period synchronized among the plurality of nodes in the network;
   a categorization engine configured to:
      receive current flow rate information from each of the plurality of nodes exactly once during a current instance of the regularly repeating time period; and
      categorize each of a plurality of data-packet flows passing through the plurality of links on the network into a first category or a second category for the current instance of the regularly repeating time period for each link by comparing the current flow rate information to a previously determined fair-share flow rate for the link, wherein the first category is associated with flows that are bottlenecked at the link and the second category is associated with flows that are bottlenecked elsewhere;
      determine, for each link, an aggregate rate representative of a sum of the current rates for received flows categorized into the second category during the current instance of the regularly repeating time period;
   a counting engine configured to count a number of flows categorized into the first category for the current instance of the regularly repeating time period for each link, wherein, for each link, the count is stored in a first register and the aggregate rate is stored in a second register;
   a fair-share flow regulator configured to interface with the counting engine and the categorization engine to determine a new fair-share flow rate for the current instance of the regularly repeating time period in each link based on the count and the aggregate rate, wherein the fair-share flow regulator is also configured to determine whether the aggregate rate for the current instance of the regularly repeating time period in each link is less than a usable link capacity; and
   a controller configured to provide control instructions to each of the plurality of flow nodes to regulate the rate of each flow based on fair-share flow rates calculated for each link of the plurality of links, wherein the control instructions provided to each particular flow source instruct the particular flow source to either decrease or increase its flow rate.

13. The system of claim 12, wherein the fair-share flow regulator is further configured to calculate a next fair-share flow rate value for a next instance of the regularly repeating time period based on the new fair-share flow rate.

14. The system of claim 12, wherein the system is further configured to determine a maximum rate of all flows determined to be bottlenecked elsewhere and configured to store the maximum rate of bottlenecked elsewhere flows in a third register.

15. The system of claim 12, wherein the categorization engine is further configured to receive an opening flow-and-rate packet and to determine from the opening flow-and-rate packet whether values stored in at least one of the first register and second register should be corrected to account for a new flow and whether another new fair-share flow rate should be calculated.

16. The system of claim 12, wherein the categorization engine is further configured to receive a closing flow-and-rate packet and to determine from the closing flow-and-rate packet whether values stored in at least one of the first register and second register values should be adjusted to account for a flow that is closing.

17. The system of claim 12, wherein the fair-share flow regulator is configured to determine the new fair-share flow rate for each link based on the count and the aggregate rate by applying the following formula: $FSR=(C_u-BEAR)/(BHFC)$, where FSR is the new fair-share flow rate for the link, $C_u$ is the usable link capacity, BEAR is the aggregate rate of the link, and BHFC is the count of the link.

18. The system of claim 12, wherein the controller is further configured to immediately provide a message to a flow source with instructions to reduce flow rate when the categorization engine determines that the current flow rate information is above a previously determined fair-share flow rate for the link by a predetermined threshold.

19. The method of claim 1, further comprising:
   in response to a determination that the aggregate rate for the current instance of the regularly repeating time period is greater than the usable link capacity, incrementing the count by at least one to produce an updated count and reducing the aggregate rate to produce an updated aggregate rate, wherein reducing the aggregate rate includes changing the categorization for at least one flow from the second category to the first category and reducing the aggregate rate by an amount corresponding to the flow rate of that at least one flow; and
   recalculating the new fair-share flow rate based on the updated count and the updated aggregate rate.

20. The system of claim 12, wherein the fair-share flow regulator is configured to:
   in response to a determination that the aggregate rate for the current instance of the regularly repeating time period is greater than the usable link capacity, increment the count by at least one to produce an updated count and reduce the aggregate rate to produce an updated aggregate rate, wherein reducing the aggregate rate includes changing the categorization for at least one flow from the second category to the first category and reducing the aggregate rate by an amount corresponding to the flow rate of that at least one flow; and
   recalculate the new fair-share flow rate based on the updated count and the updated aggregate rate.

* * * * *